United States Patent
Kanashima et al.

(10) Patent No.: US 6,231,705 B1
(45) Date of Patent: May 15, 2001

(54) METHOD FOR LAMINATING BOARDS

(75) Inventors: Keinosuke Kanashima, Osaka; Norihide Higaki, Ibaraki; Toshiyuki Fujioka, Osaka; Susumu Nojiri, Moriguchi; Hiroyuki Fukuno; Osamu Hirota, both of Kadoma, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/155,270

(22) PCT Filed: Mar. 27, 1997

(86) PCT No.: PCT/JP97/01042

§ 371 Date: Sep. 25, 1998

§ 102(e) Date: Sep. 25, 1998

(87) PCT Pub. No.: WO97/35720

PCT Pub. Date: Oct. 2, 1997

(30) Foreign Application Priority Data

Mar. 28, 1996 (JP) .................................................. 8-073536
Apr. 11, 1996 (JP) .................................................. 8-089243

(51) Int. Cl.[7] ............................ B32B 31/06; B32B 31/28
(52) U.S. Cl. ..................... 156/74; 156/273.7; 156/275.5; 156/275.7; 156/295
(58) Field of Search .......................... 156/74, 228, 273.7, 156/275.5, 275.7, 295

(56) References Cited

U.S. PATENT DOCUMENTS 4,877,475 * 10/1989 Uchida et al. ..................... 156/273.7
4,990,208 * 2/1991 Kano .................................... 156/295
5,022,556   6/1991 Dency et al. .
5,951,806 * 9/1999 Amo et al. ........................ 156/275.5

FOREIGN PATENT DOCUMENTS

| 61902 73 | 5/1975 | (AT) . |
| 38 30 866 | 3/1990 | (DE) . |
| 39 35 994 | 5/1991 | (DE) . |
| 40 41 199 | 7/1992 | (DE) . |
| 44 02 676 | 8/1995 | (DE) . |
| 0 243 517 | 11/1987 | (EP) . |
| 61-194662 | 8/1986 | (JP) . |
| 05020714 | 1/1993 | (JP) . |
| 6-50577 | 6/1994 | (JP) . |
| 7-4818 | 1/1995 | (JP) . |
| 08045113 | 2/1996 | (JP) . |
| 9-17040 | 1/1997 | (JP) . |
| 87/02934 | 5/1987 | (WO) . |
| 96/36675 | 11/1996 | (WO) . |

* cited by examiner

*Primary Examiner*—Jeff H. Aftergut
*Assistant Examiner*—Michael A. Tolin
(74) *Attorney, Agent, or Firm*—Wenderoth, Lind & Ponack, L.L.P.

(57) ABSTRACT

A method for laminating boards includes placing boards with a narrow gap therebetween, inserting an adhesive injection nozzle the gap, discharging of adhesive from the nozzle into the gap so that the discharged adhesive makes into contact with the two boards, continuing discharging the adhesive while the boards are being rotated in a planar direction thereof so that the adhesive is placed in a loop within the gap, retreating the nozzle from the gap, and narrowing the gap between the boards so that the adhesive is spread throughout the gap.

12 Claims, 12 Drawing Sheets

METHOD FOR LAMINATING BOARDS

BACKGROUND OF THE INVENTION

1. Technical Field

The present invention relates to a method and apparatus for laminating boards.

2. Description of Related Art

DVDs (digital video disks) have been developed as an information recording medium that makes use of light. The DVDs, which are capable of recording large amounts of data with far higher densities, compared with ordinary CDs, CD-ROMs, LDs and the like, are commonly regarded as suitable for high-quality long-time recording of images such as movies as well as high-volume storage of computer data.

The structure of DVDs is exemplified by two-layer lamination single-side-reading disks. Specifically, this type of DVD has a structure as shown in FIG. 21. Single boards A, B, in each of which a signal recording layer 1 made of a metal thin film or the like is sandwiched integrally between a disk body 2 and a protective layer 3 both made of transparent resin, are laminated together with an adhesive layer C interposed therebetween. By applying a laser beam L from one surface side and by changing its focal point, a signal can be read from either one of the two signal recording layers 1. In this structure, the recording capacity doubles that of a single-layer signal recording layer 1, and yet the laser beam L only needs to be applied from one surface side without the need of reversing the disk. Thus the structure has an advantage of simplified laser mechanism and disk handling mechanism.

For the production of such DVDs, it is necessary to perform the step of laminating previously and separately fabricated single boards A, B with the adhesive layer C.

A conventional method for laminating the single boards A, B is that, with a relatively large amount of adhesive applied on the entire surface of one single board, the other single board is placed on top of the coated board and then the two single boards are pressed together thus accomplishing the joint of single boards by adhesive.

For the single-side-reading system DVDs, the laser beam L applied from one surface side needs to serve for reading the opposite-side signal recording layer 1 through the adhesive layer C. Therefore, such defects as microscopic foams or faulty adhesion, if present in the adhesive layer C, would largely affect the information reading precision.

Unfortunately, with the conventional method for laminating single boards A, B as described above, there has been a tendency that foams enter the adhesive layer C, resulting in poor yields of products. It could be presumed that, during the process of placing the other single board B on the adhesive layer C that has been applied onto one single board A, local voids or pits and projections would inevitably be generated between the surface of the adhesive layer C and the opposing surface of the single board B, thus allowing foams to enter therein. Indeed increasing the amount of the adhesive to be applied to the single board would reduce the generation of foams to some extent, but it has been difficult to eliminate the foams at such high precision as is required for the DVDs. Still, using larger quantities of adhesive than is necessary for adhesion would result in a waste of adhesive and would moreover add to the work of treating the adhesive that has overflowed from between the single boards.

The aforementioned issue can occur, without being limited to the DVDs, also when various types of boards are laminated together by the medium of adhesive.

SUMMARY OF INVENTION

Accordingly, an object of the present invention is to provide a method and apparatus for laminating boards capable of reducing the occurrence of defects such as foams and also reducing the amount of use of adhesive during the work of laminating boards by the medium of adhesive in the production of DVDs and the like.

In accomplishing these and other aspects, according to a first aspect of the present invention, there is provided a method for laminating boards by a medium of adhesive, comprising:

placing boards face to face with a narrow gap therebetween;

inserting an adhesive injection nozzle into the gap;

discharging adhesive from the adhesive injection nozzle into the gap so that the discharged adhesive makes contact with the two boards while a distance between the gap is $r_1 + r_2 * (0.2$ through $0.6)$ where $r_1$ is an outer diameter of the nozzle and $r_2$ is an inner diameter of the nozzle;

continuing discharging the adhesive while the boards are being rotated in a planar direction thereof so that the adhesive is placed into the gap;

retreating the adhesive injection nozzle from the gap; and narrowing the gap between the boards so that the adhesive placed is spread throughout the gap.

According to a second aspect of the present invention, there is provided a method for laminating boards by a medium of adhesive, comprising:

placing boards face to face with a narrow gap therebetween;

inserting an adhesive injection nozzle into the gap;

discharging adhesive from the adhesive injection nozzle into the gap so that the discharged adhesive makes contact with the two boards while the nozzle starts to discharge the adhesive at a position in a range of 30% through 70% of a radius of the board from a center of the board;

continuing discharging the adhesive while the boards are being rotated in a planar direction thereof so that the adhesive is placed into the gap;

retreating the adhesive injection nozzle from the gap; and narrowing the gap between the boards so that the adhesive placed is spread throughout the gap.

According to a third aspect of the present invention, there is provided a method for laminating boards according to the first aspect, wherein in discharging the adhesive, the adhesive continues discharging while the boards are being rotated in a planar direction thereof so that the adhesive is placed in a loop into the gap.

According to a fourth aspect of the present invention, there is provided a method for laminating boards according to the second aspect, wherein in discharging the adhesive, the adhesive continues discharging while the boards are being rotated in a planar direction thereof so that the adhesive is placed in a loop into the gap.

According to a fifth aspect of the present invention, there is provided a method for laminating boards according to the first aspect, wherein in discharging the adhesive, the adhesive injection nozzle is inserted in a tangential direction perpendicular to the radial direction.

According to a sixth aspect of the present invention, there is provided a method for laminating boards according to the second aspect, wherein in discharging the adhesive, the adhesive injection nozzle is inserted in a tangential direction perpendicular to the radial direction.

According to a seventh aspect of the present invention, there is provided a method for laminating boards according to the first aspect, wherein a number of rotation of the boards in narrowing the gap between the boards is larger than a number of rotation of the boards in continuing discharging the adhesive.

According to an eighth aspect of the present invention, there is provided a method for laminating boards according to the second aspect, wherein a number of rotation of the boards in narrowing the gap between the boards is larger than a number of rotation of the boards in continuing discharging the adhesive.

According to a ninth aspect of the present invention, there is provided a method for laminating boards according to the seventh aspect, wherein a number of rotation of the boards in narrowing the gap between the boards is about thirty times larger than a number of rotation of the boards in continuing discharging the adhesive.

According to a 10th aspect of the present invention, there is provided a method for laminating boards according to the eighth aspect, wherein a number of rotation of the boards in narrowing the gap between the boards is about thirty times larger than a number of rotation of the boards in continuing discharging the adhesive.

According to an 11th aspect of the present invention, there is provided a method for laminating boards according to the third aspect, wherein in placing the adhesive in the loop, the boards are rotated in the planar direction while the boards are held substantially parallel with each other.

According to a 12th aspect of the present invention, there is provided a method for laminating boards according to the fourth aspect, wherein in placing the adhesive in the loop, the boards are rotated in the planar direction while the boards are held substantially parallel with each other.

According to a 13th aspect of the present invention, there is provided a method for laminating boards according to the 11th aspect, wherein in placing the adhesive in the loop, a start point and an end point of the adhesive to be placed in the loop are shifted, radially with respect to a center of rotation in the planar direction.

According to a 14th aspect of the present invention, there is provided a method for laminating boards according to the 12th aspect, wherein in placing the adhesive in the loop, a start point and an end point of the adhesive to be placed in the loop are shifted, radially with respect to a center of rotation in the planar direction.

According to a 15th aspect of the present invention, there is provided a method for laminating boards according to the first aspect, wherein in discharging the adhesive from the adhesive injection nozzle, the adhesive is discharged in an oblique direction inclined oppositely to the direction of rotation with respect to a radius of the rotation in the planar direction.

According to a 16th aspect of the present invention, there is provided a method for laminating boards according to the second aspect, wherein in discharging the adhesive from the adhesive injection nozzle, the adhesive is discharged in an oblique direction inclined oppositely to the direction of rotation with respect to a radius of the rotation in the planar direction.

According to a 17th aspect of the present invention, there is provided a method for laminating boards according to the first aspect, wherein in inserting the adhesive injection nozzle into the gap, the adhesive injection nozzle having a flat cross section at a portion where the adhesive injection nozzle is inserted into the gap is used as the adhesive injection nozzle.

According to an 18th aspect of the present invention, there is provided a method for laminating boards according to the second aspect, wherein in inserting the adhesive injection nozzle into the gap, the adhesive injection nozzle having a flat cross section at a portion where the adhesive injection nozzle is inserted into the gap is used as the adhesive injection nozzle.

According to a 19th aspect of the present invention, there is provided a method for laminating boards according to the first aspect, wherein in placing the adhesive in the loop, discharge of the adhesive and rotation of the boards are mechanically synchronized in the planar direction.

According to a 20th aspect of the present invention, there is provided a method for laminating boards according to the second aspect, wherein in placing the adhesive in the loop, discharge of the adhesive and rotation of the boards are mechanically synchronized in the planar direction.

According to a 21st aspect of the present invention, there is provided a method for laminating boards according to the first aspect, wherein in narrowing the gap, the boards are pressed so as to narrow the gap between the boards, and thereafter, while the boards are not pressed, the boards are rotated so that the adhesive placed is spread throughout the gap.

According to a 22nd aspect of the present invention, there is provided a method for laminating boards according to the second aspect, wherein in narrowing the gap, the boards are pressed so as to narrow the gap between the boards and thereafter, while the boards are not pressed, the boards are rotated so that the adhesive placed is spread throughout the gap.

According to a 23rd aspect of the present invention, there is provided a method for laminating boards according to the first aspect, wherein in narrowing the gap, the boards are pressed so as to narrow the gap between the boards, and thereafter, while the boards are pressed, the boards are rotated so that the adhesive placed is spread throughout the gap.

According to a 24th aspect of the present invention, there is provided a method for laminating boards according to the second aspect, wherein in narrowing the gap, the boards are pressed so as to narrow the gap between the boards, and thereafter, while the boards are pressed, the boards are rotated so that the adhesive placed is spread throughout the gap.

According to a 25th aspect of the present invention, there is provided a method for laminating boards according to the first aspect, wherein in narrowing the gap, the boards are rotated so that the adhesive placed is spread throughout the gap, and thereafter, while the boards stop rotating, the boards are pressed so as to narrow the gap between the boards.

According to a 26th aspect of the present invention, there is provided a method for laminating boards according to the second aspect, wherein in narrowing the gap, the boards are rotated so that the adhesive placed is spread throughout the gap, and thereafter, while the boards stop rotating, the boards are pressed so as to narrow the gap between the boards.

According to a 27th aspect of the present invention, there is provided a method for laminating boards according to the 23rd aspect, wherein the adhesive is an ultraviolet-curing adhesive, further comprising curing the adhesive by an ultraviolet-irradiation lamp after the gap is narrowed.

According to a 28th aspect of the present invention, there is provided a method for laminating boards according to the 24th aspect, wherein the adhesive is an ultraviolet-curing adhesive, further comprising curing the adhesive by an ultraviolet-irradiation lamp after the gap is narrowed.

According to a 29th aspect of the present invention, there is provided a method for laminating boards according to the 27th aspect, wherein the ultraviolet-irradiation lamp is relatively linearly irradiated on the adhesive of the boards.

According to a 30th aspect of the present invention, there is provided a method for laminating boards according to the 28th aspect, wherein the ultraviolet-irradiation lamp is relatively linearly irradiated on the adhesive of the boards.

According to a 31st aspect of the present invention, there is provided a method for laminating boards by a medium of adhesive, comprising:

placing boards face to face with a narrow gap therebetween;

inserting an adhesive injection nozzle into the gap;

discharging adhesive from the adhesive injection nozzle into the gap so that the discharged adhesive makes contact with the two boards while a distance between the gap is $r_1+r_2*(0.2$ through $0.6)$ where $r_1$ is an outer diameter of the nozzle and $r_2$ is an inner diameter of the nozzle and while the nozzle starts to discharge the adhesive at a position in a range of 30% through 70% of a radius of the board from a center of the board;

continuing discharging the adhesive while the boards are being rotated in a planar direction thereof so that the adhesive is placed into the gap;

retreating the adhesive injection nozzle from the gap;

narrowing the gap between the boards so that the adhesive placed is spread throughout the gap while the boards are pressed and thereafter rotating the boards while the boards are pressed so that the adhesive placed is spread throughout the gap; and curing the adhesive by an ultraviolet-irradiation lamp after the gap is narrowed, the adhesive being an ultraviolet-curing adhesive.

According to a 32nd aspect of the present invention, there is provided an apparatus for carrying out a method for laminating boards according to the first aspect, the apparatus comprising:

a board holding device for holding the boards face to face with the gap therebetween, where the gap is changeable;

an adhesive injection device including the adhesive injection nozzle which can be inserted into the gap, an advance/retreat mechanism for advancing and retreating the adhesive injection nozzle into and from the gap, and a discharge mechanism for discharging the adhesive from the adhesive injection nozzle; and a board rotating device for rotating the boards held by the board holding device in the planar direction.

According to a 33rd aspect of the present invention, there is provided an apparatus for carrying out a method for laminating boards according to the second aspect, the apparatus comprising:

a board holding device for holding the boards face to face with the gap therebetween, where the gap is changeable;

an adhesive injection device including the adhesive injection nozzle which can be inserted into the gap, an advance/retreat mechanism for advancing and retreating the adhesive injection nozzle into and from the gap, and a discharge mechanism for discharging the adhesive from the adhesive injection nozzle; and a board rotating device for rotating the boards held by the board holding device in the planar direction.

According to a 34th aspect of the present invention, there is provided an apparatus for laminating boards according to the 32nd aspect, wherein the discharge mechanism of the adhesive injection device comprises:

an adhesive accommodating cylinder for accommodating the adhesive thereon, the adhesive accommodating cylinder communicating with the adhesive injection nozzle;

a piston which advances and retreats within the adhesive accommodating cylinder;

a drive motor for advancing and retreating the piston; and a motion transform mechanism for transforming rotation of the drive motor into advance or retreat of the piston, and wherein the apparatus further comprises a synchronizing device for synchronizing the rotation of the drive motor with rotation of the board rotating device.

According to a 35th aspect of the present invention, there is provided an apparatus for laminating boards according to the 33rd aspect, wherein the discharge mechanism of the adhesive injection device comprises:

an adhesive accommodating cylinder for accommodating the adhesive thereon, the adhesive accommodating cylinder communicating with the adhesive injection nozzle;

a piston which advances and retreats within the adhesive accommodating cylinder;

a drive motor for advancing and retreating the piston; and a motion transform mechanism for transforming rotation of the drive motor into advance or retreat of the piston, and wherein the apparatus further comprises a synchronizing device for synchronizing the rotation of the drive motor with rotation of the board rotating device.

According to a 36th aspect of the present invention, there is provided an apparatus for laminating boards according to the 32nd aspect, wherein the board holding device is a pair of board holding device each having a suction surface which is to be put into contact with one surface of one of boards and which is made from a rigid material, a suction opening opened in the suction surface, and a vacuum suction device which is coupled with the suction opening, where the suction surfaces of the pair of board holding device are placed face to face, and the board rotating device is a planarly rotating device for rotating the pair of board holding device in their respective planar directions of the suction surfaces, the apparatus further comprising:

an opposing-and-moving device for moving the pair of board holding device, relative to each other, in such a direction that the board holding device are opposed to each other so that the gap is changeable in the board holding device; and an adhesive feed device for feeding adhesive onto surfaces of the boards held by the board holding device.

According to a 37th aspect of the present invention, there is provided an apparatus for laminating boards according to the 33rd aspect, wherein the board holding device is a pair of board holding device each having a suction surface which is to be put into contact with one surface of one of boards and which is made from a rigid material, a suction opening opened in the suction surface, and a vacuum suction device which is coupled with the suction opening, where the suction surfaces of the pair of board holding device are placed face to face, and the board rotating device is a planarly rotating device for rotating the pair of board holding device in their respective planar directions of the suction surfaces, the apparatus further comprising:
an opposing-and-moving device for moving the pair of board holding device, relative to each other, in such a direction that the board holding device are opposed to each other so that the gap is changeable in the board holding device; and
an adhesive feed device for feeding adhesive onto surfaces of the boards held by the board holding device.

According to a 38th aspect of the present invention, there is provided an apparatus for laminating boards according to the 36th aspect, further comprising a planarly moving device for moving the pair of board holding device in their respective planar directions of the suction surfaces.

According to a 39th aspect of the present invention, there is provided an apparatus for laminating boards according to the 38th aspect, wherein the planarly moving device swivels and moves the pair of board holding device, relatively to each other, in their respective planar directions of the suction surfaces.

According to a 40th aspect of the present invention, there is provided an apparatus for laminating boards according to the 36th aspect, further comprising a curing device for curing the adhesive.

According to a 41st aspect of the present invention, there is provided an apparatus for laminating boards according to the 40th aspect, wherein the adhesive is an ultraviolet-curing adhesive, and the curing device is an ultraviolet-irradiation lamp.

According to a 42nd aspect of the present invention, there is provided an apparatus for laminating boards according to the 36th aspect, wherein the adhesive feed device comprise:
an adhesive injection nozzle which is to be inserted between both suction surfaces of the pair of board holding device;
an advance/retreat mechanism for advancing and retreating the adhesive injection nozzle into and from between both suction surfaces; and
a discharge mechanism for discharging the adhesive from the adhesive injection nozzle.

According to a 43rd aspect of the present invention, there is provided a method for laminating boards by a medium of adhesive, comprising:
holding boards to suction surfaces of a pair of board holding device, which have the suction surfaces, respectively, made from a rigid material, in such a way that one-side surfaces of the boards are put into contact with the suction surfaces, respectively, and sucked up thereto;
feeding adhesive onto the surface of at least one of the boards;
moving the pair of board holding device relative to each other in such directions that the surfaces of the boards held by the pair of board holding device, respectively, are opposed to each other and that a gap therebetween is narrowed; and
synchronously rotating the two boards held by the pair of board holding device, respectively, in planar directions of the boards.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF INVENTION

Figure 1:
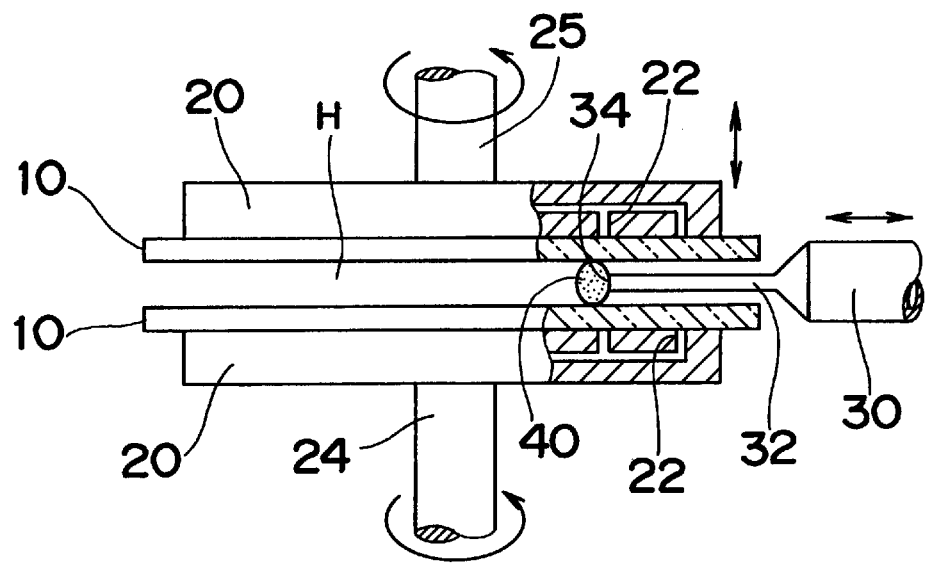
FIG. 1 is a partial sectional side view showing the first step of a method for laminating boards which is a first embodiment of the present invention.

Before the description of the present invention proceeds, it is to be noted that like parts are designated by like reference numerals throughout the accompanying drawings.

(FIRST EMBODIMENT)

The method for laminating boards according to a first embodiment of the present invention is a method for laminating boards by a medium of adhesive, the method comprising:

a. a step for placing the boards face to face with a narrow gap therebetween;

b. a step for inserting an adhesive injection nozzle into the gap;

c. a step for discharging adhesive from the adhesive injection nozzle into the gap so that the discharged adhesive makes contact with the two boards;

d. a step for continuing discharging the adhesive while the boards are being rotated in a planar direction thereof so that the adhesive is placed in a loop into the gap;

e. a step for retreating the adhesive injection nozzle from the gap; and f. a step for narrowing the gap between the boards so that the adhesive placed in a loop is spread throughout the gap.

Each component is explained below in detail.

Board

The board is manufactured in appropriate combinations of synthetic resins, metal thin films, and other materials in compliance with the purpose of application such as single boards of DVDs described before. A DVD comprises a disk body made of transparent resin such as polycarbonate resin, a recording layer in which a metal thin film or the like is placed on the pit-and-projection surface for use of recording formed on one side of the disk body, and a protective layer made of transparent resin that protects the recording layer. The boards to be laminated may be either those of the same material and the same structure or those of different materials or structures. The configuration of the board is a thin circular disc in the case of DVDs, whereas it may be other than circular-disc shape depending on the purpose of application of laminated boards. Besides, the boards may be machined into a configuration after the laminating process.

Adhesive

The adhesive to be used may be selected from among various types of adhesives according to the material and application of the boards to be laminated. For DVDs, it is preferable to use ultraviolet-curing type transparent adhesives. It is also possible to use radiation-curing type or self-curing type adhesives and thermosetting type adhesives or the like other than the ultraviolet-curing type adhesives. Depending on the application, non-transparent adhesives may be used in some cases.

Adhesive Injection Nozzle

The adhesive injection nozzle is required only to be able to place the adhesive into the gap between boards without any particular limitations on its configuration and structure. The adhesive injection nozzle has a hollow needle-like shaped basic structure that allows the adhesive to pass through the inside. Whereas the adhesive injection nozzle normally has a circular cross section, an elliptical or oval, flat shaped cross section, if provided, allows the adhesive injection nozzle to be easily inserted into a narrow gap or allows the adhesive to be dischargeable over a wider area in the same time. The adhesive injection nozzle is combined with a device for feeding the adhesive, a discharge mechanism for discharging the adhesive from the adhesive injection nozzle, and an advance/retreat mechanism for inserting and retreating the adhesive injection nozzle into and from the gap between the boards, all of which constitutes an adhesive injector. Actually, mechanical equipment such as so called injection nozzles or syringes that are available for injection of various adhesives and other chemicals can be applied.

Next each step is explained below.

a. Step of Placing Boards Face to Face

The gap needs to be narrow enough to allow the adhesive discharged from the adhesive injection nozzle to adhesively contact both-side boards. However, the gap preferably provides such a clearance between boards that the actuated adhesive injection nozzle would not be damaged upon contact with the boards. Varying depending on the configurational structure of the adhesive injection nozzle, the properties of the adhesive used, and the like, the gap is usually set to about 2 mm or less. The gap should be as narrow as possible only if the adhesive injection nozzle is enabled to advance and retreat. The gap is preferably within a range of from 1.4 to 1.8 mm.

In usual cases, the boards are placed face to face by being opposed to each other in a substantially parallel state. In some cases, depending on the conditions of application, it is also possible that the boards are opposed to each other in a non-parallel state at an inclination of a relatively small angle in order that the adhesive can be easily injected while the boards are being rotated or so that the adhesive will easily spread inward and outward in a radial direction. Further, although the boards, if positioned horizontal, would have an effect of weight on the spreading of the adhesive uniformly in all directions, the boards may also be slightly inclined with respect to the horizontal plane.

b. Step of Inserting the Adhesive Injection Nozzle

The adhesive injection nozzle is inserted from outer periphery of the boards toward the center of the gap. The position where the adhesive injection nozzle is inserted is preferably selected as one that allows the adhesive, discharged from the adhesive injection nozzle, to be easily spread throughout the gap. In more detail, the discharge opening for the adhesive is preferably set at a location close to the center between the rotational center and outer periphery of the boards.

The adhesive injection nozzle is easy to insert when inserted from the outer periphery toward the center of the gap along the radial direction that extends from the center of rotation in the planar direction toward the outer periphery of the boards. Also, when the adhesive injection nozzle is inserted into the gap obliquely at an inclination with respect to the radial direction, the work of placing the adhesive in a loop by rotating the boards in the planar direction is smoothed. In this case, the direction in which the adhesive is discharged should be oriented along the direction in which the boards are rotated in the planar direction. It is also possible that the adhesive injection nozzle is inserted in a tangential direction perpendicular to the radial direction.

The adhesive injection nozzle may be inserted into the gap either by being advanced and retreated linearly or by being swiveled from outside of the boards.

c. Step of Discharging the Adhesive

The adhesive may be discharged either from the tip end of the adhesive injection nozzle or from midway of the adhesive injection nozzle. The adhesive discharge opening of the adhesive injection nozzle may be so formed that the adhesive injection nozzle is cut out along a direction perpendicular to the axis or otherwise that the adhesive injection nozzle is cut out obliquely. The discharge opening for the adhesive may be provided at a plurality of points along the adhesive injection nozzle. The configuration of the discharge opening is preferably one that allows the discharged adhesive to securely contact both-side boards. For this purpose, it is effective to form the discharge opening into such a shape that the discharged adhesive will easily be spread to both sides.

Other than that the adhesive injection nozzle is inserted obliquely with respect to the radial direction, it is also possible that only the direction in which the adhesive is discharged is made oblique by adjusting the configurational structure of the discharge opening of the adhesive injection nozzle.

d. Step of Placing the Adhesive in a Loop

In order for the boards to be rotated in the planar direction, the holding mechanisms for the respective boards may appropriately be rotationally driven by motor or the like. It is preferable to rotate the two boards in synchronization with each other.

As the adhesive continues to be discharged by the adhesive injection nozzle with the boards kept rotating in the planar direction, the adhesive is placed into the gap so as to draw a circumferential trace along the rotational direction. Whereas the time required to place the adhesive in a loop becomes shorter with increasing rotational speed of the boards, the placement configuration of the adhesive becomes more likely to collapse due to the effect of centrifugal force or the like caused by to the rotation. Accordingly, by taking into account the properties of the adhesive, an appropriate rotational speed is set. Over one rotation of the boards, the adhesive is placed in a loop into the gap. The placement of the adhesive into a closed loop allows the adhesive to be easily spread in all directions of the gap in subsequent processes.

The width and amount of the looped adhesive to be placed into the gap are determined depending on the conditions of the discharge amount of adhesive and the rotational speed of the boards. The amount of adhesive is so set that the adhesive will spread at a required thickness throughout the gap. As placing the adhesive in an amount slightly larger than necessary would prevent shortage of adhesive at inner and outer peripheral edges of the gap, the method does not need to use adhesive in such an amount that the adhesive would largely overflow out of the gap. When the discharge amount of adhesive and the rotation of boards are controlled so as to be synchronized with each other, the looped adhesive results in a uniform width over the entire circumference, so that the adhesive can be more easily spread uniformly throughout the gap.

Indeed it is generally effective to rotate the boards in a substantially parallel state along the direction of a horizontal plane in order that the adhesive is placed uniformly throughout from inner to outer circumferences. However, the boards may also be rotated at a slight inclination, taking into consideration the fluidity or the like of the adhesive due to the rotation. In addition, rotating the boards in the planar direction should be construed as including not only the case where the board plane and the rotational plane are completely coincident with each other, but also the case where the board plane and the rotational plane are a little shifted from each other without impairing the functions and effects of the present invention.

The trace of the adhesive to be placed in a loop is normally so arranged that the start point and the end point are of the same position. Also, it is effective to slightly shift the end point from the start point outward in the radial direction. This arrangement makes it possible to avoid faults due to the occurrence that the adhesive injection nozzle that has reached the end point sticks to the adhesive that was discharged at the start point. If the adhesive injection nozzle contacts the discharged adhesive, the adhesive sticking to the adhesive injection nozzle is drawn along with the retreating adhesive injection nozzle out of the gap, causing a so-called thread-draw phenomenon, with the result that the placement configuration of the adhesive would collapse, where foams or other defects would be more likely to occur. However, with the arrangement that the start point and the end point are shifted from each other as described above, it is unlikely that the adhesive will stick to the adhesive injection nozzle.

e. Step of Retreating the Adhesive Injection Nozzle

When the adhesive has been completely placed in a loop, the discharge of adhesive from the adhesive injection nozzle is stopped and the adhesive injection nozzle is retreated out of the gap. During this process, the adhesive injection nozzle preferably retreats along such a direction so as not to contact the adhesive that has already been placed. The retreating motion of the adhesive injection nozzle is implemented by any optional motion such as linear motion or swiveling motion along the axial direction, as in the insertion step.

f. Step of Spreading the Adhesive

When one or both of the boards are moved in such a direction as to approach each other in the state that the adhesive has been placed in a loop into the gap, the gap is narrowed so that the adhesive in the gap is spread uniformly to inner and outer peripheries in the radial direction while in contact with the boards at both sides, thus filling the whole gap. The gap may appropriately be narrowed to such an extent that both-side boards can securely be joined together by the medium of the layer of the spread adhesive. More specifically, although varying depending on the application of laminated boards, the gap may be narrowed, normally, to 0.5 to 1.8 mm. The gap may be narrowed, desirably, while the boards are maintained substantially parallel with each other, in order that the adhesive is spread over the entire circumference of the gap.

It is true that only narrowing the gap would allow the adhesive to be spread throughout the gap, but rotating the boards in the planar direction in combination with the narrowing of the gap will allow the spreading of the adhesive to be accelerated by the effect of centrifugal force due to the rotation or the like, while the occurrence of defects such as foams can be reduced.

The planar rotation of boards can be implemented by using the same mechanism as in the looped placement step of adhesive described above. For easier spreading of adhesive, it is preferable to rotate the boards at a relatively high speed. More specifically, a rotational speed around 1000 to 8000 rpm may be adopted.

g. Other Steps

After the adhesive has been spread over the whole gap, curing the adhesive as it is completes the jointing of the boards with each other. The curing of the adhesive is accomplished by a curing device such as ultraviolet or other irradiation and heating, depending on the type of adhesive.

If the adhesive has overflowed the inner and outer peripheries of the boards, the adhesive may be removed either before curing the adhesive or after curing the adhesive, through the machining process or the like.

Laminating Apparatus

The apparatus for laminating boards according to the embodiment is an apparatus for embodying the method for laminating boards as described above. The apparatus comprises a board holding device, an adhesive injection device, and a board rotating device.

The board holding device holds the boards in such a way that the boards are opposed to each other across a gap, while the board holding device can change the magnitude of the gap.

More specifically, it is appropriate to provide holding mechanisms that can hold the boards with the opposing faces of the boards opened, where one or both of the holding mechanisms should be movable in the direction in which the boards are opposed to each other. The holding mechanisms for boards may be selected from among various types of board-material holding mechanisms that mechanically grasp the boards, suck up in vacuum, or suck up electrostatically. For movement of the holding mechanisms, there are available actuator mechanisms for ordinary mechanical equipment such as cylinder mechanisms and gear mechanisms.

The adhesive injection device comprises an adhesive injection nozzle, an advance/retreat mechanism for advancing and retreating the adhesive injection nozzle into the gap, and a discharge mechanism for discharging the adhesive from the adhesive injection nozzle.

The advance/retreat mechanism may be implemented by a mechanism that transforms the rotation of a motor into advance/retreat motion via gears, cams or racks and transfers the motion, or a cylinder mechanism or actuator mechanism using pneumatic pressure or electromagnetic force.

The discharge mechanism may be implemented by ordinary chemical discharge mechanism equipment only if the discharge process of adhesive is enabled. More specifically, it may be a piston cylinder mechanism or a quantitative discharge pump mechanism or the like.

If the discharge mechanism operates in synchronization with the board rotating device, the adhesive can be placed into a uniform looped shape more easily during the process that the adhesive is placed in a loop while the boards are being rotated. In order that the discharge mechanism and the board rotating device are synchronized with each other, it is effective to share the drive source, such as a motor, that drives the two members. A discharge mechanism that discharges the adhesive by mechanical actuation can be synchronized with the board rotating device more easily than a discharge mechanism that discharges the adhesive by an actuation mechanism using air or other fluid pressure.

The discharge mechanism may comprise an adhesive accommodating cylinder, a piston, a drive motor, and a motion transform mechanism. The adhesive accommodating cylinder accommodates adhesive in an amount necessary for laminating the boards. The adhesive accommodating cylinder may also comprise an adhesive feed device for feeding the adhesive from external. The adhesive accommodating cylinder communicates with the adhesive injection nozzle. The piston advances and retreats within the adhesive accommodating cylinder, thereby feeding the adhesive along the discharge direction of the adhesive injection nozzle. The rotation of the drive motor is transformed into the advancing and retreating motion of the piston via the motion transform mechanism. The motion transform mechanism can be made up from a combination of mechanical motion transform mechanisms such as gears, cams, racks and the like.

The board rotating device rotates the boards in the planar direction. The board rotating device is used not only in the adhesive looped placement process as described before, but also in the adhesive spreading process. In the case where the board rotating device is used in both processes, the board rotating device is preferably one that is capable of setting rotational speeds appropriate for the two processes, respectively. In order that the boards placed with a gap therebetween are rotated in the planar direction, it is effective to rotate the holding mechanisms of the two boards simultaneously by one motor. It is also effective to mount both board rotating mechanisms to the same rotating shaft.

The board laminating apparatus may comprise a carry-in/carry-out device for carrying the boards into and out of the board holding mechanism, the curing device such as irradiation equipment for executing the adhesive curing process, and other mechanism equipment for executing various types of pre- and post-processes.

The method and apparatus for laminating boards according to the embodiment are applicable not only to DVDs consisting of two-layer lamination single-side-reading disks as described before but also to the lamination of boards in various types of optical reading disks. Further, the method and apparatus are applicable to the lamination of boards, other than optical disks, that have similar issues.

The method and apparatus as shown in FIGS. 1 through 7 are used for the production of DVDs consisting of two-layer lamination single-side-reading disks.

(Step of inserting the adhesive injection nozzle)

Figure 2:
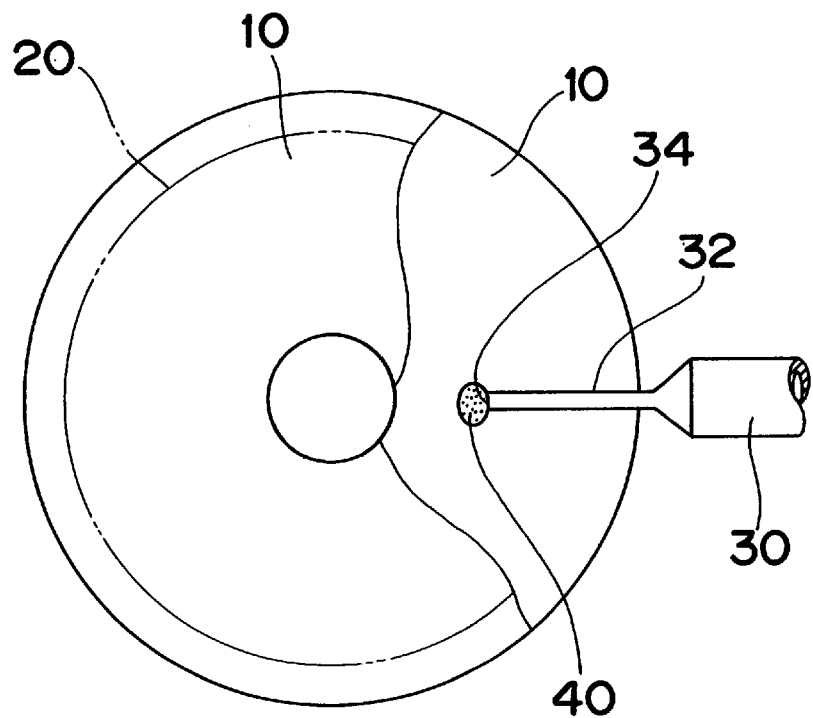
FIG. 2 is a partly cut-out plan view of the same process in the first embodiment.
Figure 21:
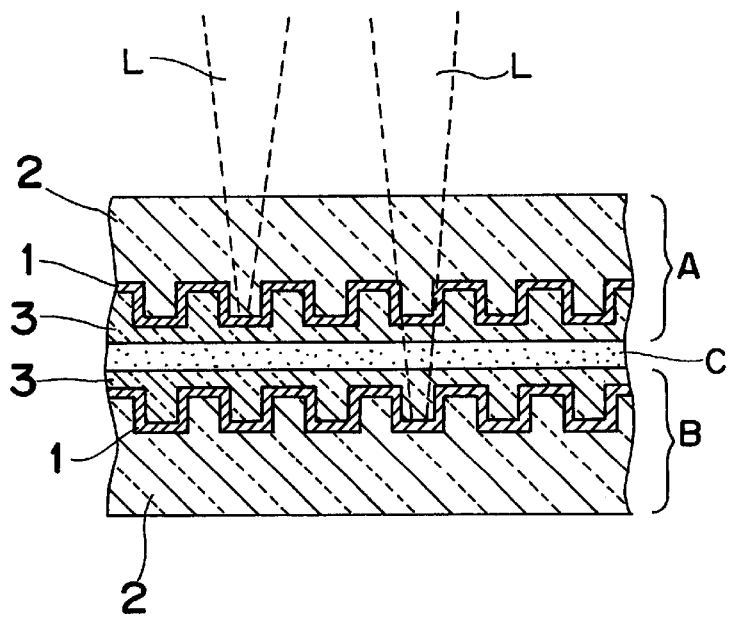
FIG. 21 is a sectional view showing the structure of a DVD.

As shown in FIG. 1, disk single boards 10 are held by vacuum suck-up discs 20, respectively. Each of the disk single boards 10 is shaped into a circular disk with a hole in the center as shown in FIG. 2. In more detail, as shown in FIG. 21, each disk single board 10 is composed of polycarbonate resin or the like, and has a recording signal layer in the interior. The disk single board 10 usually has a thickness of about 0.6 mm and an outer size of about 12 cm.

The vacuum suction disc 20 has a plurality of vacuum suction openings 22 opened at a surface thereof which makes contact with the surface of the disk single board 10, by which the vacuum suction disc 20 sucks up the disk single board 10 by vacuum. The smooth surface of the vacuum suction disc 20 serves a function of correcting distortions or bumps and dips of the disk single board 10 when the vacuum suction disc 20 has sucked up the disk single board 10. The vacuum suction openings 22 of the vacuum suction disc 20 are coupled with a vacuum source 523 via a vacuum pipe 123. The vacuum suction disc 20, which comprises a rotating shaft 24, is rotated by a motor 60. A pair of vacuum suction discs 20 will rotate synchronously.

The disk single boards 10 held by the vacuum suction disc 20 are maintained horizontal while they keep substantially parallel above and below in the state that the disk single boards 10 are spaced from each other with a specified gap H between their opposing surfaces. The gap H is set to around 1.4 mm.

Figure 20:
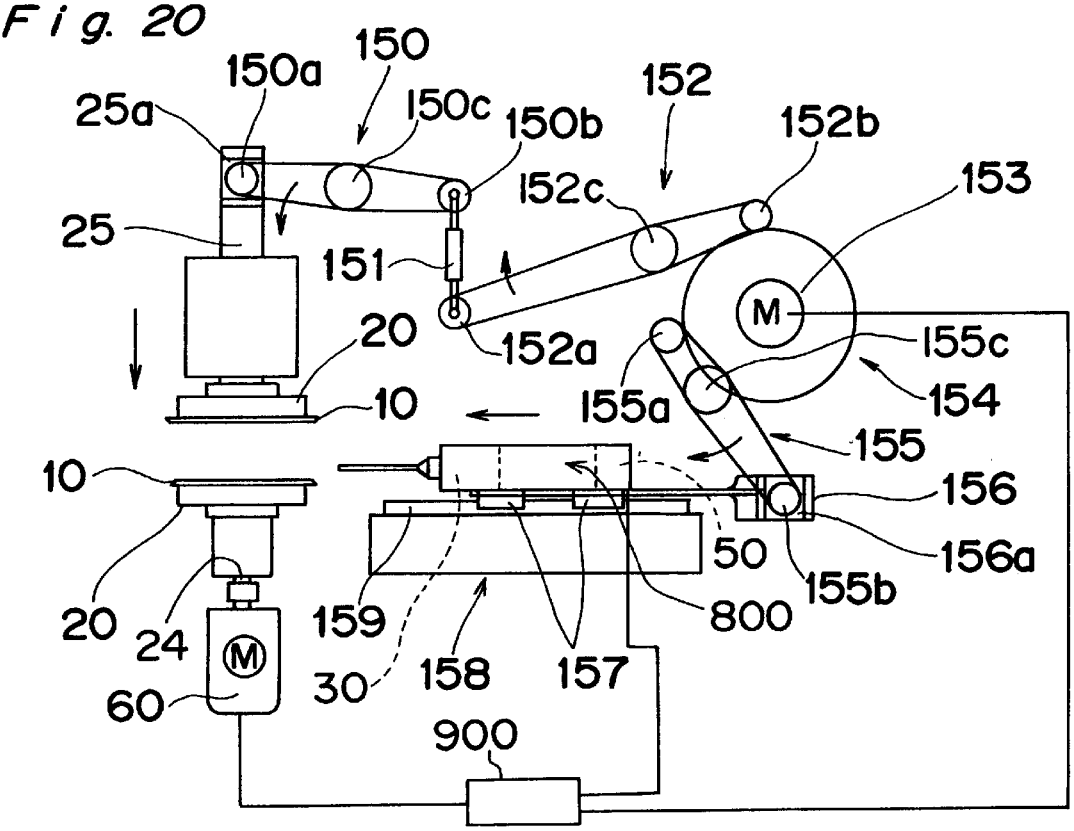
FIG. 20 is an explanatory view showing a seventh embodiment of the present invention.

An adhesive injector 30 has a thin, needle-like injection nozzle 32 at an end thereof. As shown in FIG. 20 described later, the adhesive injector 30 is equipped with an advance/retreat mechanism for advancing and retreating the adhesive injector 30 radially of the disk single board 10. The end of the injection nozzle 32 is inserted into the gap H from the outer periphery of the disk single board 10 along the radial direction. A discharge open 34 is opened at the end of the injection nozzle 32. The discharge opening 34 is located close to the center or midway of the radius of the disk single board 10. The adhesive injector 30 has ultraviolet-curing adhesive accommodated therein.

(Adhesive discharging process)

When adhesive 40 is discharged from the discharge opening 34, the adhesive 40 swells outside the discharge opening 34, and spreads in the form of droplets. The upper and lower peripheral ends of the adhesive 40 make contact with the disk single boards 10, respectively. It should be noted that the move to the next process is effected after the adhesive 40 has been put into positive contact with the disk single boards 10 on both sides.

(Looped placement process)

Figure 3:
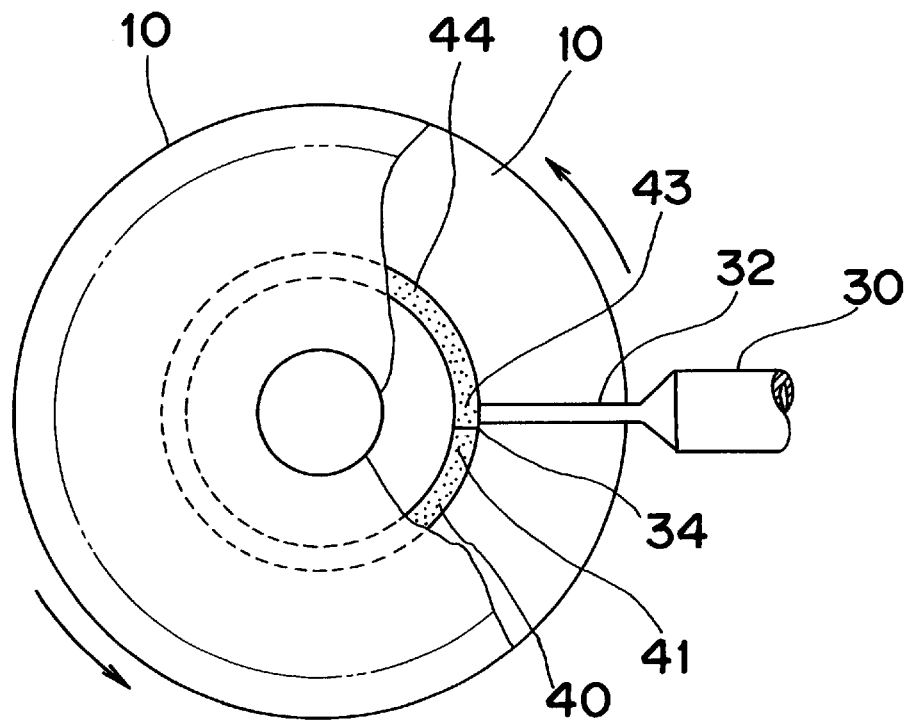
FIG. 3 is a partly cut-out plan view showing the next process in the first embodiment.
Figure 4:
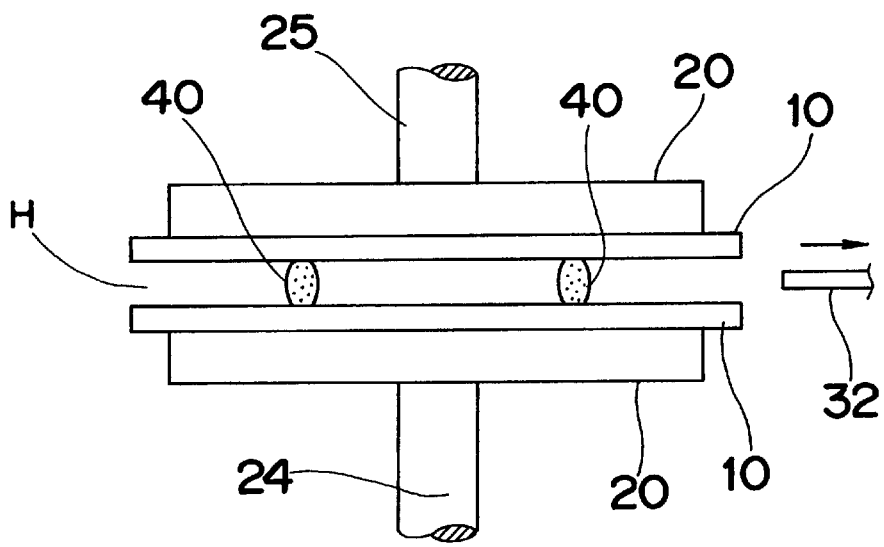
FIG. 4 is a side view showing the next process in the first embodiment.

As shown in FIG. 3, while the upper and lower vacuum suction discs 20 are being rotated, the adhesive 40 is continuously discharged from the injection nozzle 32. The adhesive 40 that is discharged from the discharge opening 34 will draw a trace circumferentially along the gap H in accordance with the rotation of the disk single boards 10. Upon one rotation of the disk single board 10, a start point 41 and an end point 43 of the circumferential locus of the adhesive 40 are connected with each other, completing a loop 44 of the adhesive 40. As shown in FIG. 4, upper and lower ends of this adhesive loop 44 are in contact with the disk single boards 10 over their entire circumference.

(Retreating process of injection nozzle)

As shown in FIG. 4, the injection nozzle 32 is moved radially so as to be retreated outside the disk single boards 10.

(Adhesive spreading process)

Figure 5:
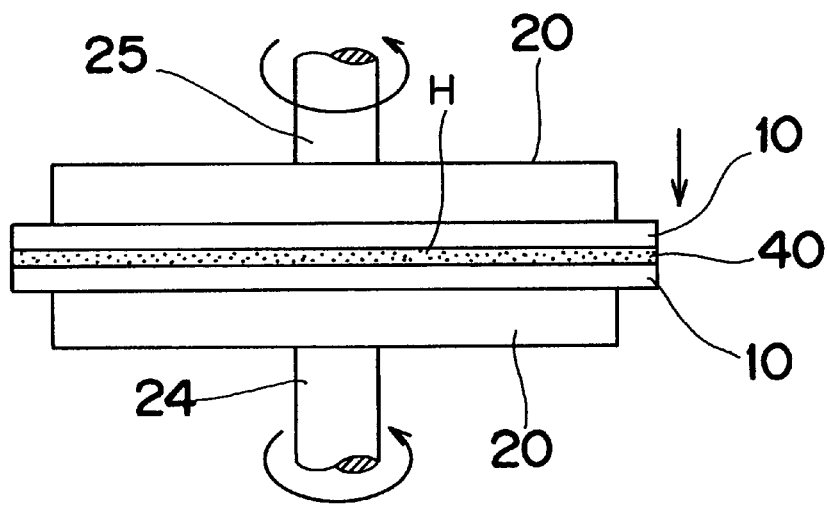
FIG. 5 is a side view showing the next process in the first embodiment.

As shown in FIG. 5, the upper-side vacuum suction disc 20 is lowered so as to approach the lower-side disk single board 10, by which the gap H is narrowed. At the same time, the upper and lower vacuum suction discs 20 are rotate synchronously in a parallel state and along the planar direction. The adhesive 40 of the adhesive loop 44 placed in the gap H is sandwiched between the disk single boards 10, while the adhesive 40 spreads to the whole inner and outer peripheries of the gap H by the effect of centrifugal force created by the rotation and the like, thus filling the gap H at a uniform thickness.

Figure 6:
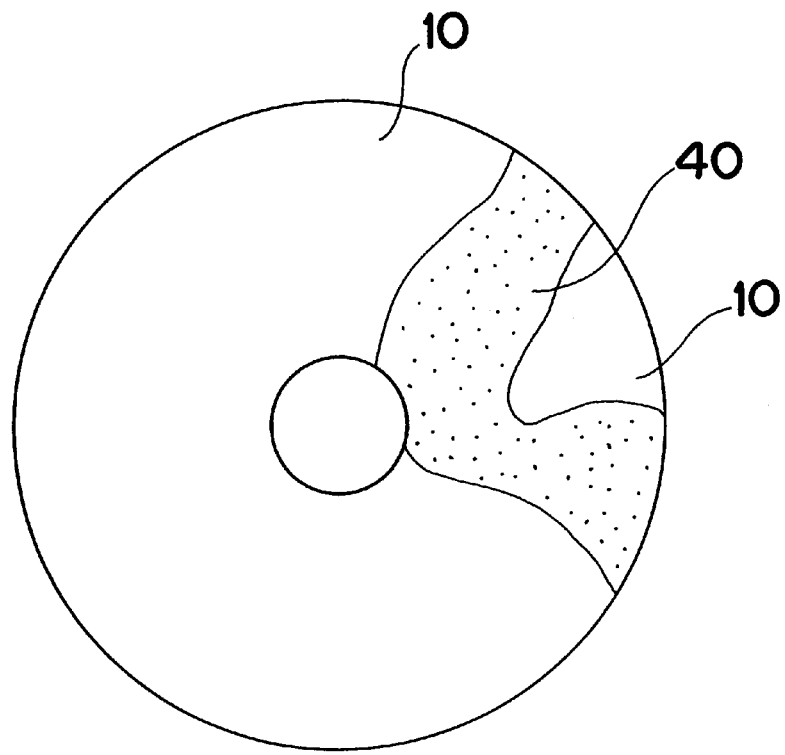
FIG. 6 is a partly cut-out plan view of laminated boards in the first embodiment.
Figure 7:
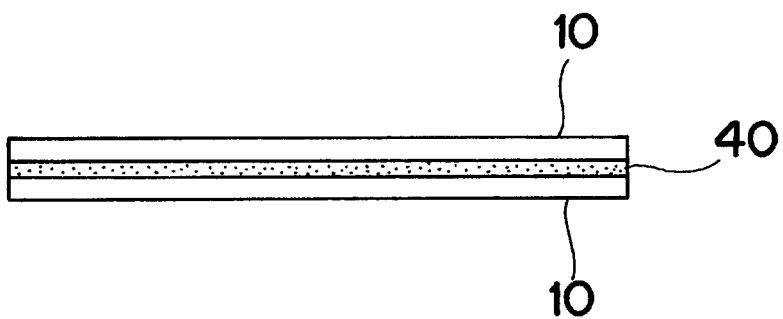
FIG. 7 is a side view of the laminated boards in the first embodiment.

As shown in FIGS. 6 and 7, the upper and lower disk single boards 10 are joined integrally by the medium of the adhesive 40 intervening therebetween. In addition, a curing process such as an ultraviolet-irradiation process is carried out depending on the properties of the adhesive 40. This curing process, if carried out with the disk single boards 10 held to the vacuum suction discs 20, becomes easy to treat in that the disk single boards 10 and the adhesive 40 will not shift in position and placement configuration.

The disk single boards 10 laminated by the adhesive 40 are subjected to appropriate post-processing or finishing process, depending on the purpose of use or the application. Thus, laminated boards are completed.

(SECOND EMBODIMENT)

Figure 8:
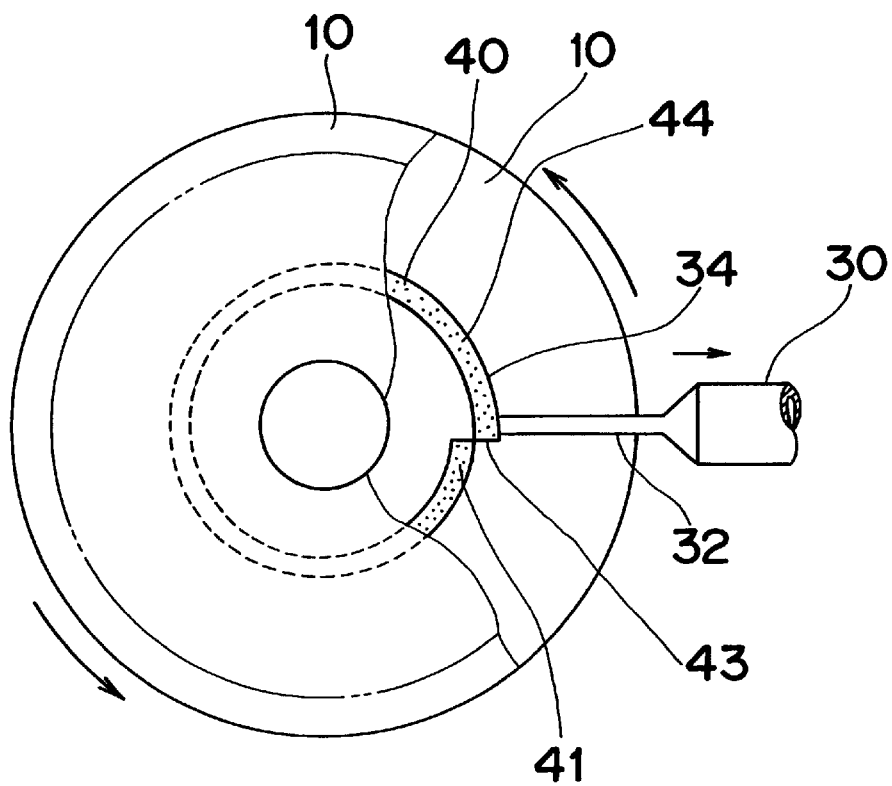
FIG. 8 is a partly cut-out plan view of a process showing a second embodiment of the present invention.

A second embodiment of the present invention shown in FIG. 8 is basically common to the foregoing embodiment, but differs therefrom in the placement pattern of the adhesive 40.

In the process of discharging the adhesive 40 from the injection nozzle 32 while the disk single boards 10 are being rotated, the injection nozzle 32, i.e., the adhesive injector 30 is moved gradually outward in the radial direction. Then, a loop 44 drawn by the adhesive 40, which was discharged from the injection nozzle 32, will not form a complete circular loop as shown in FIG. 3, but result in such a form that the end point 43 is slightly shifted toward the outer periphery of the boards, compared with the start point 41.

With this arrangement, when the discharge opening 34 and the injection nozzle 32 have approached a portion of the end point 43, the adhesive 40 of the start point 41 that has been discharged previously can be prevented from sticking to peripheries of the discharge opening 34 or the injection nozzle 32. Thus, such disadvantages as thread draw of the adhesive 40 are unlikely to occur. Furthermore, it is unlikely to occur that the start point 41 and the end point 43 overlap each other and the adhesive 40 accumulates in larger amounts at this portion than the other portions. This makes it easy to place the adhesive 40 uniformly over the entire circumference of the adhesive loop 44.

(THIRD EMBODIMENT)

Figure 9:
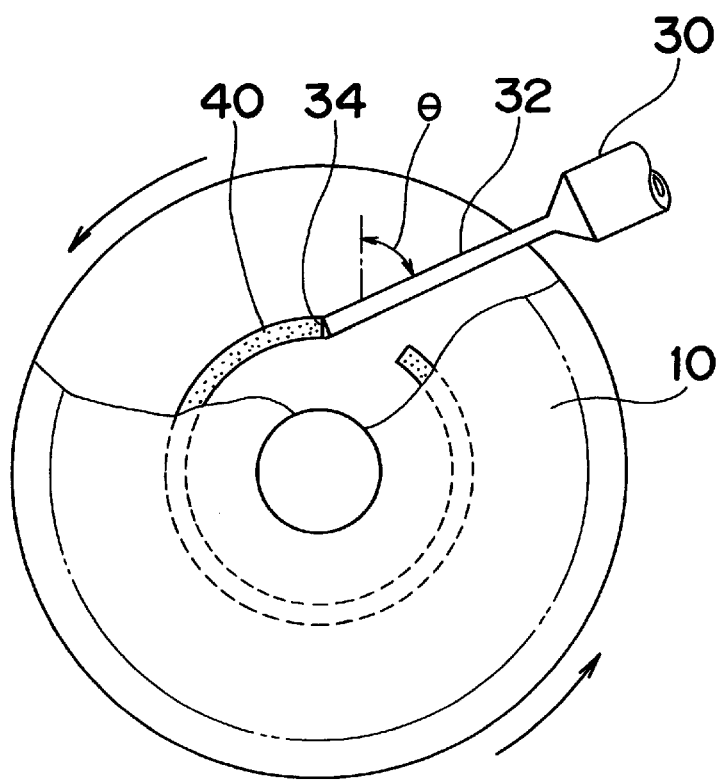
FIG. 9 is a partly cut-out plan view of a process showing a third embodiment of the present invention.

A third embodiment of the present invention shown in FIG. 9 is basically common to the foregoing embodiment, but differs therefrom in the placement of the injection nozzle 32.

When the injection nozzle 32 is inserted into the gap H between the disk single boards 10, an angle θ is formed between the radial direction of the disk single boards 10 with respect to the rotational center and the axial direction of the injection nozzle 32. That is, the injection nozzle 32 is inserted obliquely with respect to the radial direction. It is noted that the injection nozzle 32 is inclined so as to form the angle θ between the rotational direction of the disk single boards 10 and the opposite direction.

With this arrangement, the work of placing the adhesive 40 into a loop can be carried out smoothly. In this connection, when the injection nozzle 32 was positioned along the radial direction, the adhesive 40 discharged radially from the injection nozzle 32 would be put into motion along a direction perpendicular to the radial direction immediately after making contact with the disk single boards 10. As a result, too high a rotational speed of the disk single boards 10 would make it difficult to smoothly place the adhesive 40. In contrast to this, with the injection nozzle 32 positioned obliquely, since less shift between the discharge direction of the adhesive 40 and the rotational direction of the disk single boards 10 is involved, the smooth placement of the adhesive 40 can be easily achieved even when the rotational speed of the disk single boards 10 are heightened.

(FOURTH EMBODIMENT)

Figure 10:
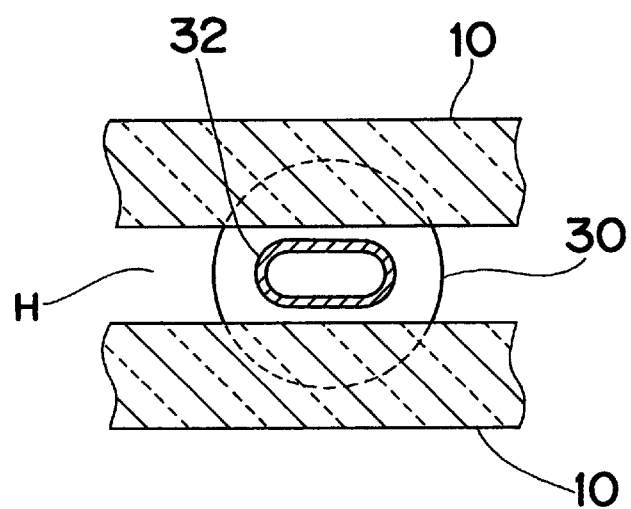
FIG. 10 is a main-part enlarged sectional view of an adhesive injection nozzle showing a fourth embodiment of the present invention.

A fourth embodiment of the present invention shown in FIG. 10 is basically common to the foregoing embodiment, but differs therefrom in the placement of the injection nozzle 32.

The injection nozzle 32 has a flat, oval cross section. The portion of the discharge opening 34 is similar in cross sectional shape. Accordingly, compared with an injection nozzle that has the same heightwise size and a circular cross section, the injection nozzle 32 is enabled to increase the amount of the adhesive 40 to be discharged, improving the efficiency of the work. Furthermore, even with the same cross sectional area, the heightwise size is reduced so that the injection nozzle 32 can be smoothly inserted even into a narrower gap H.

(FIFTH EMBODIMENT)

Figure 11:
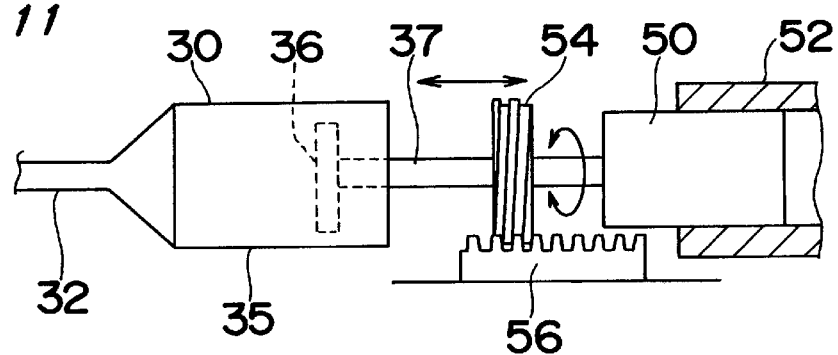
FIG. 11 is a schematic structural view of an adhesive injector showing a fifth embodiment of the present invention.

A fifth embodiment of the present invention shown in FIG. 11 shows a detailed structure of the adhesive injector 30.

The adhesive injector 30 has a tubular cylinder 35 communicating with the injection nozzle 32. The adhesive 40 is accommodated in the cylinder 35, and a piston 36 is slidably placed in the rear of the adhesive 40. By the piston 36 advancing, the adhesive 40 within the cylinder 35 is discharged from the injection nozzle 32. An actuator shaft 37 is mounted at the rear of the piston 36, and connected to a motor 50. The motor 50 is supported to a fixedly-located support member 52 so as to be unrotatable and movable in the axial direction. A screw gear 54 is provided on the actuator shaft 37. The screw gear 54 is meshed to a fixed rack 56.

When the motor 50 is driven to rotate, the screw gear 54 rotates. The screw gear 54 meshed with the fixed rack 56 will move forward and backward with rotation. The actuator shaft 37, the motor 50, and the piston 36 linked with the screw gear 54 will also be actuated forward and backward. With such an arrangement, the rotation of the motor 50 is transformed into linear motion of the piston 36, by which the adhesive 40 is discharged from the injection nozzle 32.

In addition, the motion of advancing and retreating the adhesive injector 30 into and from the gap H causes the support structure including the adhesive injector 30, the motor 50, the support member 52, the fixed rack 56 and the like to be integrally advanced and retreated.

In the embodiment, the discharge amount of the adhesive 40 can be set correctly. In more detail, since the rotational amount of the motor 50 is transferred and transformed mechanically so as to be reflected on the motion amount of the piston 36 or the discharge amount of the adhesive 40, the discharge amount of the adhesive 40 can be controlled with good precision by controlling the rotational amount of the motor 50 electrically. Changes in the viscosity and properties of the adhesive are unlikely to affect the discharge amount. Therefore, environmental conditions such as temperature are unlikely to affect the discharge amount. The rotation of the motor 50 and the rotation of the motor 50 that drives the disk single boards 10 can be electrically controlled so as to be precisely synchronized. As a consequence, the adhesive loop 44 to be placed in the gap H can be uniformed in thickness or width over the entire circumference, so that the adhesive 40 can finally be spread and placed uniformly throughout the gap H. With the adhesive 40 placed uniformly, it becomes unlikely that defects such as foams take place.

In the method and apparatus for laminating boards according to the present invention, adhesive is placed in a gap between boards, which are opposed to each other with a narrow gap, in such a way that the adhesive makes contact with the both-side boards. As a result, when the adhesive is spread over the whole gap with the gap between boards narrowed, such defects as foams are unlikely to occur. Thus, a laminated board excellent in quality and performance can be obtained.

(SIXTH EMBODIMENT)

The apparatus for laminating boards according to a sixth embodiment of the present invention is an apparatus for laminating boards by a medium of adhesive, comprising a pair of board holding device, an opposing-and-moving device, a planarly rotating device, and an adhesive feed device. The board holding device each has a suction surface which is to be put into contact with one surface of the board and which is made from a rigid material, a suction opening opened in the suction surface, and a vacuum suction device which is coupled with the suction opening, where the suction surfaces of the pair of board holding device are placed face to face. The opposing-and-moving device moves the pair of board holding device, relative to each other, in such directions that the board holding device are opposed to each other. The planarly rotating device rotates the pair of board holding device in their respective planar directions of the suction surfaces. The adhesive feed device feeds the adhesive onto surfaces of the boards held by the board holding device.

Each component is explained below in detail.

Board

The board is manufactured in appropriate combinations of synthetic resins, metal thin films, and other materials in compliance with the purpose of application such as single boards of DVDs described before. A DVD comprises a disk body made of transparent resin such as polycarbonate resin, a recording layer in which a metal thin film or the like is placed on the pit-and-projection surface for use of recording formed on one side of the disk body, and a protective layer made of transparent resin that protects the recording layer. The boards to be laminated may be either those of the same material and the same structure or those of different materials or structures. The configuration of the board is a thin circular disc in the case of DVDs, whereas it may be other than circular-disc shape depending on the purpose of application of laminated boards. Besides, the boards may be machined in configuration after the laminating process.

For the boards, due to some issues in molding precision and machining precision, or to distortions and residual stress generated during the manufacturing processes and the handling of the boards, there are possibilities that their surfaces may be warped or that undulations or local pits and projections may take place. The present invention allows some extent of warp and deformation of the surfaces of the boards, if involved, to be corrected during the lamination process.

Adhesive

The adhesive to be used may be selected from among various types of adhesives according to the material and application of the boards to be laminated. For DVDs, it is preferable to use ultraviolet-curing type transparent adhesives. It is also possible to use radiation-curing type or self-curing type adhesives and thermosetting type adhesives or the like other than the ultraviolet-curing type adhesives. Depending on the application, non-transparent adhesives may be used in some cases.

Board Holding Device

The suction surface has enough shape and size to make contact with a one-side surface of the board opposite to the surface to be adhesively bonded, out of the two-side surfaces of the board. For example, if the board is circular shaped, the suction surface may also be circular shaped. Whereas the suction surface may be a complete smooth surface that can make contact with the entire one-side surface of the board without clearances, the suction surface may have local pits and projections or grooves if the function of correcting any warp and deformation can be exerted to such an extent as necessary for the boards. The suction surface is made from a material higher in rigidity than the boards so that the deformation of the boards can be corrected. Varying depending on the material and structure of the boards, the material of the suction surface may usually be metals such as stainless steel, ceramics, glass, hard synthetic resin or the like.

The suction surface may have thereon a protrusion for restricting the movement of the sucked-up board in the planar direction, and a positioning member such as a protruding frame or a step gap.

The suction opening is opened in the suction surface. The suction opening may be formed into a circular, elliptical or other hole shape, or into a slit, mesh, or other shapes suitable for the suction of boards. The suction opening has only to be placed at least in a region of the suction surface that makes contact with the board. The density and placement pattern of the suction opening is set, as required, responsive to the required sucking function and correcting function for the boards.

The suction opening is coupled with the vacuum suction device, such as a vacuum pump, via a suction passage provided inside the member constituting the suction surface.

The board holding device is provided for each of a pair of boards to be laminated, and their suction surfaces are placed opposite to each other. For simplicity of structure and convenience of bonding work, both suction surfaces are placed opposite to each other in a state that the suction surfaces are parallel with each other above and below. However, there are some cases where the two suction surfaces are placed in a state inclined with respect to the horizontal plane. This inclination angle may be either fixed or variable as required. The suction surfaces opposed to each other may be either positioned in a fully parallel state or, if necessary, positioned in a non-parallel state that the suction surfaces are inclined to each other.

The board, when sucked and held to the suction surface of the board holding device, can be moved along with the board holding device. The sucked board is deformed so as to make close contact with the suction surface, by which the board is corrected into a planar shape along the suction surface.

Opposing-and-moving Device

The opposing-and-moving device moves the pair of board holding device having the suction surfaces, respectively, relative to each other in such directions that the board holding device are opposed to each other. That is, the suction surfaces of the board holding device become closer to or farther from each other so that the gap between the two suction surfaces is narrowed or widened. Out of the pair of board holding device, either only one board holding device or both board holding device may be moved.

Concretely, the mechanism for the opposing-and-moving device is implemented in combination of linear moving mechanisms for ordinary mechanical equipment, such as electromagnetic cylinder, air cylinder or other cylinder mechanisms, rack and pinion or other gear mechanisms, and cam mechanisms.

The opposing-and-moving device sets the gap between the pair of board holding device selectively at least either to a state that the adhesive can be fed to the surface of the board, or to a state that the boards are placed with an adhesive layer of a specified thickness interposed therebetween. The two boards with the adhesive sandwiched therebetween are pressed against each other by actuating the opposing-and-moving device, by which the adhesive is spread uniformly throughout the gap between the boards. Thus, the boards can be laminated on each other by the medium of adhesive.

Planarly Rotating Device

The planarly rotating device rotates a pair of board holding device in their respective planar directions of the suction surfaces. The rotation may be carried out in either one way that the rotating surface is fully coincident with the planar direction of the suction surface or another way that the rotating surface and the suction surface form an angle within such a scope as can be regarded as substantially in a planar direction.

The planarly rotating device includes a rotational drive source such as a motor, and a rotational-force transmission mechanism for transmitting the rotational force of the rotational drive source to the board holding device. The rotational-force transmission mechanism is selected from among rotational-force transmission mechanisms for ordinary mechanical equipment such as belt-pulley mechanisms, chain-sprocket mechanisms and gear mechanisms.

Rotating each board by the planarly rotating device makes it possible to place the adhesive over the entire circumference of the board while the adhesive keeps fed at a fixed position. In particular, when the adhesive is injected into the gap between a pair of boards, the adhesive can be placed in a loop so as to be in contact with both boards. Even in the step of narrowing the gap between the boards with the adhesive placed so that the adhesive is spread over, rotating each board in the planar direction makes the adhesive more easily spread fast and uniform over the board. The appropriate rotational speed may differ between placement step and spreading step of the adhesive, in which case the planarly rotating device is preferable one that can change the rotational speed.

The planarly rotating device is preferably one capable of synchronously rotating a pair of board holding device. For synchronously rotating a pair of board holding device, it is simple that rotational force of one drive source can be transmitted simultaneously to both board holding device. However, it is better, in some cases, that the rotations of a pair of board holding device are shifted from each other.

Adhesive Feed Device

The adhesive feed device feeds adhesive to a surface or surfaces of both of a pair of boards held by the board holding device. Normally, the adhesive may appropriately be placed on the surface of a board that is placed on the lower side. Injecting the adhesive into a gap-between the boards, which are placed above and below with a narrow gap therebetween, allows the adhesive to be fed so as to come into contact the surfaces of the upper and lower boards. Of course, the adhesive may be fed to each of the upper and lower boards.

At a stage that the adhesive has been fed to the surface of the board, it is unnecessary that the adhesive has been placed over the entire surface of the board. By narrowing the gap between the boards or by rotating the boards in the planar direction, as it is, the adhesive can be spread over the entire surface of the board.

Adhesive Injection Device

The adhesive injection nozzle needs only to be able to place the adhesive into the gap between the boards placed to a pair of board holding device, without any limitations on the configuration and structure.

The adhesive injection nozzle has a hollow needle-like shaped basic structure that allows the adhesive to pass through the inside. Whereas the adhesive injection nozzle normally has a circular cross section, an elliptical or oval, flat shaped cross section, if provided, allows the adhesive injection nozzle to be easily inserted into a narrow gap or allows the adhesive to be dischargeable over a wider area at a time. The adhesive injection nozzle is combined with a device for feeding the adhesive, a discharge mechanism for discharging the adhesive from the adhesive injection nozzle, and an advance/retreat mechanism for inserting and retreating the adhesive injection nozzle into and from the gap between the boards, all of which constitutes an adhesive injector. Actually, mechanical equipment so called injection nozzles or syringes that are available for injection of various adhesives and other chemicals can be applied.

The advance/retreat mechanism advances the adhesive injection nozzle to an injection position of adhesive within the gap between the boards placed to the board holding device. Concretely, the advance/retreat mechanism may be implemented by a mechanism that transforms the rotation of a motor into advance/retreat motion via gears, cams or racks and transfers the motion, or a cylinder mechanism or actuator mechanism using pneumatic pressure or electromagnetic force.

The discharge mechanism may be implemented by ordinary chemical discharge mechanism equipment only if the adhesive can be discharged from the adhesive injection nozzle into the gap between the boards. More specifically, it may be a piston cylinder mechanism or a quantitative discharge pump mechanism or the like.

If the discharge mechanism operates in synchronization with the planarly rotating device, the adhesive can be placed into a uniform looped shape more easily during the process that the adhesive is placed in a loop while the boards are being rotated. In order that the discharge mechanism and the planarly rotating device are synchronized with each other, it is effective to share the drive source, such as a motor, that drives the two members. A discharge mechanism that discharges the adhesive by mechanical actuation can be synchronized with the planarly rotating device more easily than a discharge mechanism that discharges the adhesive by an actuation mechanism using air or other fluid pressure.

The discharge mechanism may comprise an adhesive accommodating cylinder, a piston, a drive motor, and a motion transform mechanism. The adhesive accommodating cylinder accommodates adhesive in an amount necessary for laminating the boards. The adhesive accommodating cylinder may also comprise an adhesive feed device for feeding the adhesive from external. The adhesive accommodating cylinder communicates with the adhesive injection nozzle. The piston advances and retreats within the adhesive accommodating cylinder, thereby feeding the adhesive along the discharge direction of the adhesive injection nozzle. The rotation of the drive motor is transformed into the advancing and retreating motion of the piston via the motion transform mechanism. The motion transform mechanism can be made up from a combination of mechanical motion transform mechanisms such as gears, cams, racks and the like.

The board laminating apparatus may comprise a carry-in/carry-out device for carrying the boards into and out of the board holding mechanism, and other mechanism equipment for executing various types of pre- and post-processes.

Planarly Moving Device

The board laminating apparatus may further comprise a planarly moving device for moving a pair of board holding device, relative to each other, in the planar direction of their suction surfaces. Moving the board holding device in the planar direction facilitates the processes of placing the boards to the suction surfaces of the board holding device or taking the bonded boards out of the board holding device.

Concretely, the planarly moving device is implemented by a linear or curvilinear moving device, a swiveling-and-moving device, or the like for ordinary mechanical equipment. Adopting the swiveling-and-moving device makes it easy to integrally incorporate the planarly rotating device or the opposing-and-moving device and the swiveling-and-moving device.

The planarly moving device may be designed to move either only one or both of the pair of board holding device.

Curing Device

When an adhesive that needs a curing process is used, incorporating a curing device into the board laminating apparatus allows the adhesive to be cured as it is, after the boards have been laminated together with the adhesive. This prevents the boards or the adhesive from shifting or moving during the handling of the laminated boards. On condition that the adhesive is cured with the boards corrected and held by the holding device, the corrected state of the boards can be securely maintained even after the boards have been taken out from the holding device.

Concretely, the curing device, although varying depending on the type of adhesive used, is implemented, for example, by an ultraviolet-irradiation lamp for ultraviolet-curing type adhesives. For other radiation-curing adhesives, radiation illuminating equipment suitable for respective types of curing is used. For thermosetting type adhesives, infrared heaters, hot-air blowers and the like are used.

Method for Laminating Boards

The board laminating method according to the embodiment is a method for laminating boards by a medium of adhesive, comprising: a step for holding the boards to suction surfaces of a pair of board holding device, which have the suction surfaces, respectively, made from a rigid material, in such a way that one-side surfaces of the boards are put into contact with the suction surfaces, respectively, and sucked up thereto; a step for feeding the adhesive onto the surface of at least one of the boards; a step for moving the pair of board holding device relative to each other in such directions that the surfaces of the boards held by the pair of board holding device, respectively, are opposed to each other and that a gap therebetween is narrowed; and a step for synchronously rotating the two boards held by the pair of board holding device, respectively, in planar directions of the boards.

The board laminating method can be carried out by using the board laminating apparatus as described above.

The step of sucking up and holding the boards to the board holding device may be carried out either by feeding the board held by a transfer arm or the like up to the suction surface of the board holding device, or by the board holding device moving to suck up the board. At this stage, the respective board holding device and the boards do not need to have been opposed to each other.

The board sucked up and held to the aforementioned suction surface made of a rigid material is fixed in a shape along the suction surface. Even if the board has some extent of warp and deformation due to manufacturing errors or the like, the board is corrected along the suction surface by being sucked up to the suction surface made of a rigid material.

The adhesive may be fed to either only the surface of one board or to the surfaces of the two boards or to between the two boards placed face to face with a narrow gap. The adhesive may be fed in either a bar or block form or a layer form. It is also possible to add a step for spreading the fed adhesive over the board surface or surfaces. However, at this stage, the adhesive does no need to be spread uniformly over the surface or surfaces.

The board holding device, when moved relative to each other, are not limited in the moving route and their posture. It is only required that the boards be placed face to face with a narrow gap in the end.

When the boards are synchronously rotated in the planar direction, the adhesive is spread uniformly all over the boards by the effect of centrifugal force or the like due to the rotation of the boards, so that the adhesive fills the overall gap between the boards ensured by the board holding device. As a result, the adhesive that has been spread uniform throughout the gap joins the boards together.

The apparatus and method for laminating boards according to the embodiment are applicable not only to DVDs consisting of two-layer lamination single-side reading as described before but also to the lamination of boards in various types of optical reading disks. Further, the method and apparatus are applicable to the limitation of boards, other than optical disks, that have similar issues.

Figure 12:
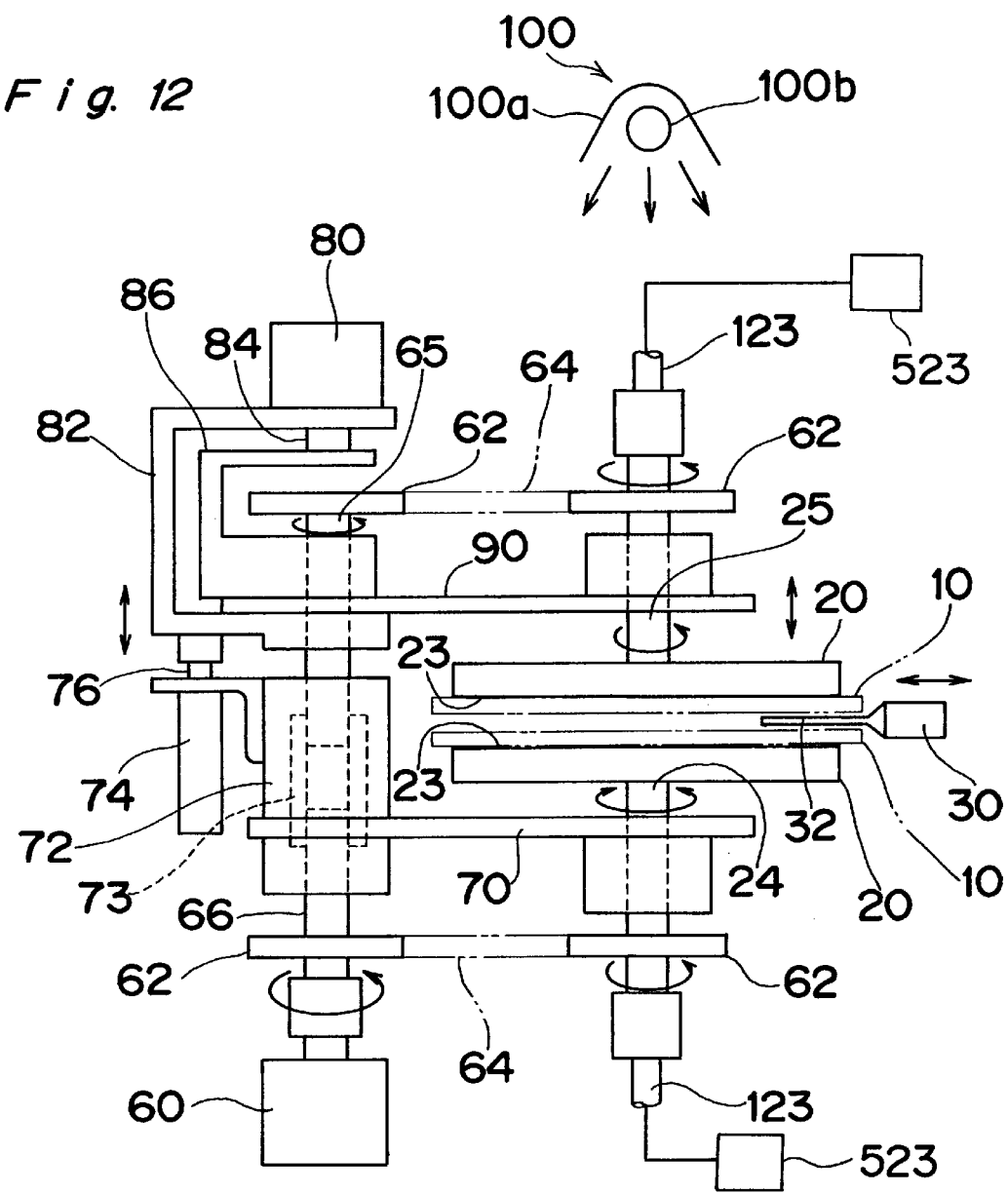
FIG. 12 is a front view of an apparatus for laminating boards which is a sixth embodiment of the present invention.
Figure 13:
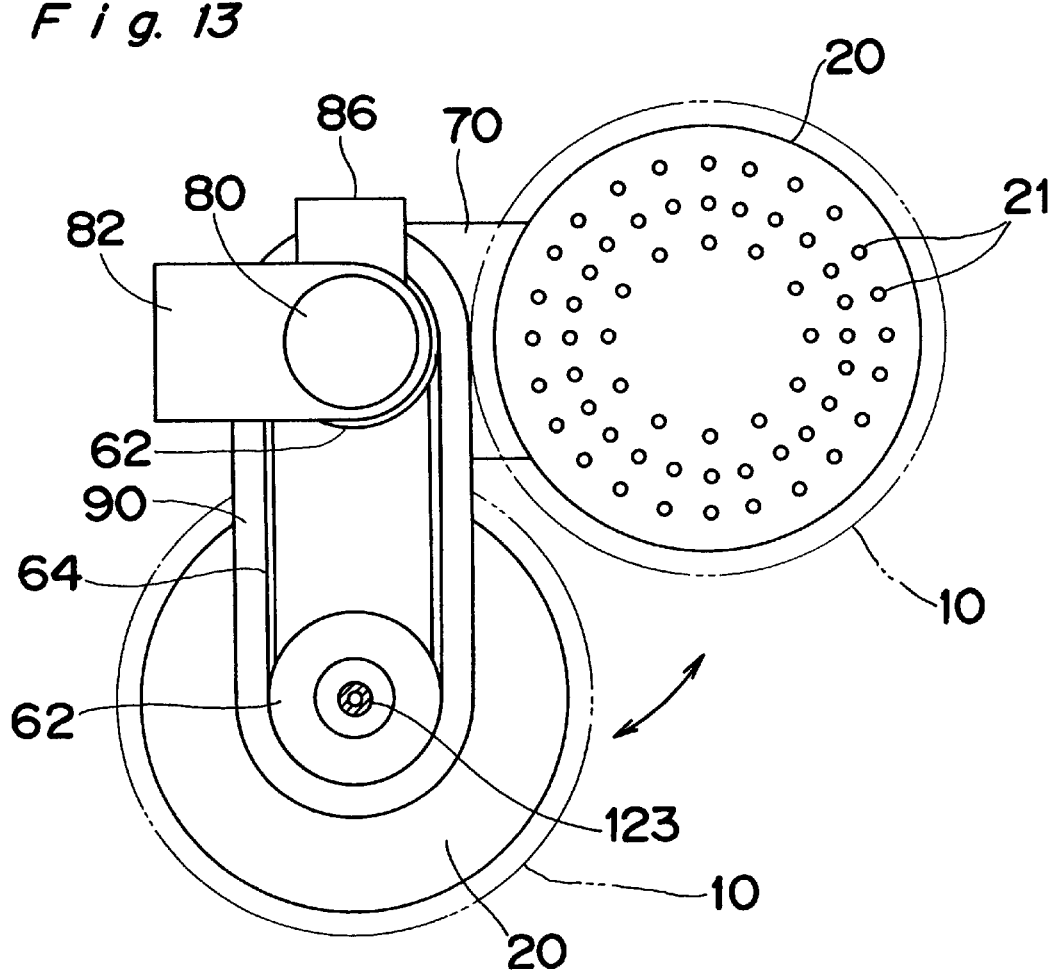
FIG. 13 is a plan view of a state in which are upper vacuum suction disc is swiveled in the sixth embodiment.

Embodiments of the Invention:

The board laminating apparatus as shown in FIGS. 12 and 13 is used for the production of DVDs consisting of two-layer lamination single-side-reading disks.

Structure of Board Laminating Apparatus

Figure 14:
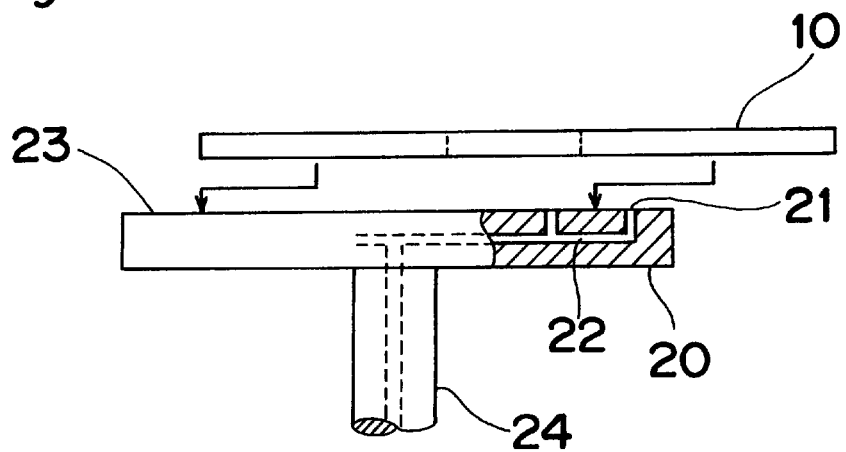
FIG. 14 is a side view showing the first process of the method for laminating boards.

As shown in FIG. 12, the laminating apparatus has a pair of suction discs 20 placed face to face above and below. The suction discs 20, which are each formed into a circular thick plate and have flat suction surfaces 23 at their respective opposing surfaces, are made of a rigid material having a smooth surface such as stainless steel. As shown in FIG. 13, a multiplicity of suction openings 21 are arranged in the suction surfaces 23. As shown in FIG. 14, each suction opening 21 communicates with a suction passage 22 passing inside the suction disc 20.

At an intermediate position of each of the suction discs 20 placed face to face above and below, an adhesive injector 30 is placed so as to be horizontally advanceable and retreatable. The adhesive injector 30 has an ultraviolet-curing type adhesive accommodated therein, and discharges the adhesive from the tip end of a needle-like adhesive injection nozzle 32 equipped at an end of the adhesive injector 30. The discharge of adhesive is effected by a piston cylinder mechanism or quantitative discharge pump mechanism equipped in the adhesive injector 30. The adhesive injector 30 is advanced and retreated by an air cylinder mechanism or rack and pinion mechanism or the like, so that the end of the adhesive injection nozzle 32 is inserted to the center of the vacuum suction disc 20.

As shown in FIG. 12, the two vacuum suction discs 20 are equipped with rotating shafts 24, 25, respectively, which are concentric and extending downward and upward. The lower and upper rotating shafts 24, 25 are rotatably supported by support members 70, 90, respectively. The rotating shafts 24, 25 have pulleys 62 connected thereto outside the support members 70, 90. The suction passages 22 of the vacuum suction discs 20 communicate with a vacuum pipe 123 which passes through the inside of the rotating shafts 24, 25, coming outside from the ends of the rotating shafts 24, 25, where the vacuum pipe 123 is connected to a vacuum source 523 such as a vacuum pump.

A pair of lower and upper drive shafts 66, 65 are rotatably supported by the lower and upper support members 70, 90 in parallel with the rotating shafts 24, 25, respectively. The lower support member 70 has a support cylinder 72 which rotatably supports the drive shafts 66, 65. Inside the support cylinder 72 is a joint mechanism 73 which couples the drive shaft 66 and the drive shaft 65 with each other. The joint mechanism 73 transfers rotating force from the drive shaft 66 to the drive shaft 65 but permits the drive shaft 65 to move axially. The joint mechanism 73 having such a function is implemented by a ordinary spline joint or the like. The drive shaft 66 is driven into rotation by a drive motor 60.

To the drive shafts 66, 65 are installed pulleys 62, respectively, at positions opposite to the pulleys 62 provided to the rotating shafts 24, 25. Belts 64 are stretched over between the pulleys 62 of the drive shafts 66, 65 and the rotating shafts 24, 25, respectively, so that the rotating force of the drive shafts 66, 65 is transferred to the rotating shafts 24, 25, by which the upper and lower vacuum suction discs 20 coupled with the rotating shafts 24, 25 are rotated synchronously.

An up-and-down actuator 74 is provided beside the upper end of the support cylinder 72. The up-and-down actuator 74 has an actuating shaft 76 at its upper end, and the actuating shaft 76 is moved up and down by an air cylinder mechanism or electromagnetic cylinder mechanism or the like. The upper end of the actuating shaft 76 is connected to a U-shaped frame 82 that supports the upper support member 90. The support member 90 is supported to the U-shaped frame 82 so as to be turnable horizontally. When the up-and-down actuator 74 is operated to move up and down, the U-shaped frame 82 and the support member 90 coupled with the actuating shaft 76 move up and down, by which the drive shaft 65, the rotating shaft 25, the pulleys 62, the belt 64 and the upper vacuum suction disc 20 supported by the support member 90 move up and down. Irrespectively of the position to which the vacuum suction disc 20 is moved up or down, the rotation of the drive motor 60 is securely transferred to the vacuum suction disc 20.

A swiveling motor 80 is mounted on top of the U-shaped frame 82. A swivel shaft 84 extending from the lower end of the swiveling motor 80 is disposed concentrically with the drive shaft 65, where the lower end of the swivel shaft 84 is connected to a U-shaped swiveling member 86. The swiveling member 86 is disposed so as to be away from the pulley 62 and turn around below the pulley 62, where the lower part of the swiveling member 86 is fixed to the support member 90. As shown also in FIG. 13, when the swiveling motor 80 is rotated, the swivel shaft 84, the swiveling member 86 and the support member 90 are swiveled horizontally, so that the vacuum suction discs 20 placed above and below are shifted horizontally.

Above the rotating shafts 24, 25, is placed an ultra-violet irradiation lamp 100*b* for use of curing the adhesive.

Laminating Process

The laminating process of DVD disk single boards 10 is carried out by using the laminating apparatus having a construction as described above.

(Step of holding boards)

Figure 15:
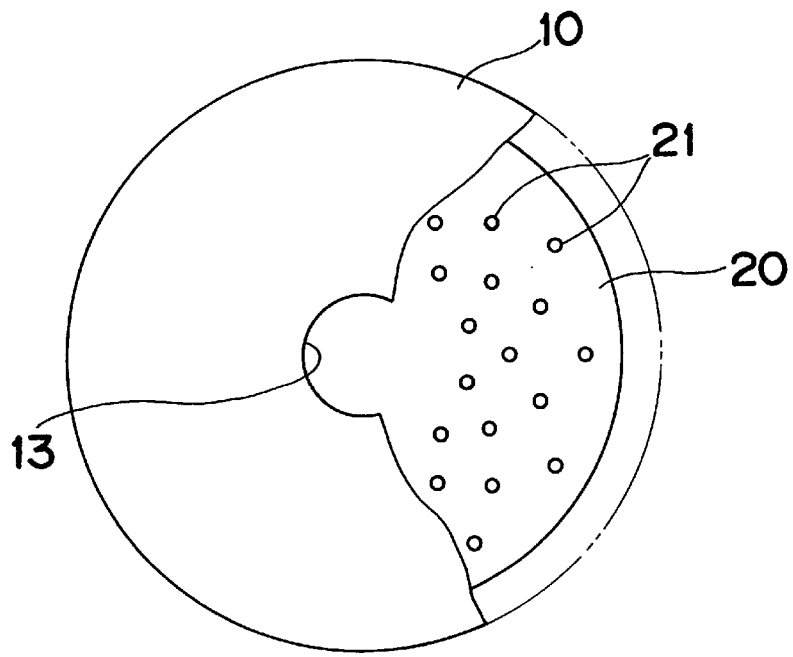
FIG. 15 is a partly cut-out plan view showing the same process.

As shown in FIG. 14, a disk single board 10 to be positioned on the lower side is placed on a suction surface 23 of the lower vacuum suction disc 20. As shown in FIG. 15, the disk single board 10 is circular-plate-shaped, having a hole in the center. In more detail, as shown in FIG. 21 mentioned before, the disk single board 10 is made of polycarbonate or the like and has a recording signal layer provided therein. The disk single board 10 has a thickness of around 0.6 mm generally, and an outside size of about 12 cm.

The disk single board 10 placed on the suction surface 23 is attracted into close contact with the suction surface 23 by vacuum suction from the suction openings 21. During this process, even if the disk single board 10 has slight distortion or deformation such as pits and projections or warp, such deformation is corrected by the disk single board 10 being attracted into close contact with the flat suction surface 23. Accordingly, the vacuum suction force from the suction openings 21 should be set to such a level that the correction of the disk single board 10 described above can be achieved.

Although not shown, the upper-side disk single board 10 is also treated in similar operation so as to be sucked up and held by the suction surface 23 of the upper-side vacuum suction disc 20.

When the work of sucking up and holding the disk single boards 10 to the vacuum suction discs 20 is carried out in the state that the upper and lower vacuum suction discs 20 are shifted in their horizontal positions as shown in FIG. 13, the transfer equipment for the disk single boards 10 is enabled to get an easy access or the operator is allowed to carry out operation or monitoring more easily. It is also effective to widen the gap between the upper and lower vacuum suction discs 20 by operating the up-and-down actuator 74 and thereby moving the upper-side vacuum suction disc 20 upward.

(Step of inserting injection nozzle)

The disk single boards 10 held by the vacuum suction discs 20 are maintained concentric and horizontal in a substantially parallel state above and below with a certain specified gap H between their opposing surfaces. The gap H is set to around 1.4 mm approximately. The adjustment of the gap H is accomplished through the actuation of the up-and-down actuator 74. The gap H may appropriately be set to such a size that adhesive 40 discharged from the adhesive injection nozzle 32 makes secure contact with both disk single boards 10 and that the adhesive injection nozzle 32 or the like will not be damaged when in contact with the disk single boards 10. Varying depending on the configurational structure of the adhesive injection nozzle 32, the properties of the adhesive 40 used, and the like, the gap is usually set to about 2 mm or less, preferably within a range of 1.4 to 1.8 mm.

As shown in FIGS. 1 and 2, the end of the injection nozzle 32 of the adhesive injector 30 is inserted into the gap H from outer periphery of the disk single board 10 along the radial direction. A discharge opening 34 is opened at the end of the injection nozzle 32. The discharge opening 34 is located close to the center on midway of the radius of the disk single board 10. This is a position where the adhesive 40 can be easily spread throughout the gap H.

(Adhesive discharging process)

When the adhesive 40 is discharged from the discharge opening 34, the adhesive 40 swells outside the discharge opening 34, going to spread in the form of droplets. The upper and lower peripheral ends of the adhesive 40 make contact with the disk single boards 10, respectively, as shown in FIG. 1. It should be noted that the move to the next process is effected after the adhesive 40 has been put into positive contact with the disk single boards 10 on both sides.

(Looped placement process)

As shown in FIG. 3, while the upper and lower vacuum suction disks 20 are being rotated, the adhesive 40 is continuously discharged from the injection nozzle 32. The adhesive 40 discharged from the discharge opening 34 will draw a trace circumferentially along the gap H in accordance with the rotation of the disk single board 10. Upon one rotation of the disk single board 10, a start point 41 and an end point 43 of the circumferential locus of the adhesive 40 are connected with each other, completing a loop 44 of the adhesive 40. As shown in FIG. 4, upper and lower ends of this adhesive loop 44 are in contact with the disk single boards 10 over their entire circumference.

In addition, during the above process, if the injection nozzle 32 is moved radially outward by degrees, the start point 41 and the end point 43 of the adhesive loop 44 to be formed are a little shifted radially. This method is effective to prevent the previously placed adhesive 40 from sticking to the adhesive injection nozzle 32 at near the end point 43.

(Retreating process of injection nozzle)

As shown in FIG. 4, the injection nozzle 32 is moved radially so as to be retreated outside the disk single boards 10.

(Adhesive spreading process)

As shown in FIG. 5, the upper-side vacuum suction disc 20 is lowered so as to approach the lower-side disk single board 10, by which the gap H is narrowed. At the same time, the upper and lower vacuum suction discs 20 are rotate synchronously in parallel state and along the planar direction. The adhesive 40 of the adhesive loop 44 placed between the gap H is held between the disk single boards 10 and the centrifuged force etc. caused by the rotation is effected, so that the adhesive 40 is spread throughout the inner and outer peripheries of the gap H to fill the gap H with the adhesive of uniform thickness. Since the adhesive loop 44 in contact with the disk single boards 10 is spread, there can be prevented such a possibility that foams invade or clearances take place between the spread adhesive 40 and the disk single boards 10.

As shown in FIGS. 5 and 6, the upper and lower disk single boards 10 are joined integrally by the medium of the adhesive 40 intervening therebetween.

For the above process, the gap H has only to be narrowed to such an extent that both-side disk single boards 10 can be securely joined with the layer of the spread adhesive 40. Normally, the gap may be narrowed to about 0.5 to 1.8 mm.

Indeed the adhesive 40 will be spread throughout the gap H only by narrowing the gap H. However, by rotating the disk single boards 10 in the planar direction as well as by narrowing the gap H, the adhesive 40 will be spread more promptly by the effect of centrifugal force and the like due to the rotation, and besides the occurrence of defects such as foams will be reduced. The rotational speed of the disk single boards 10 is preferably around 1000 to 8000 rpm.

(Curing process)

Figure 16:
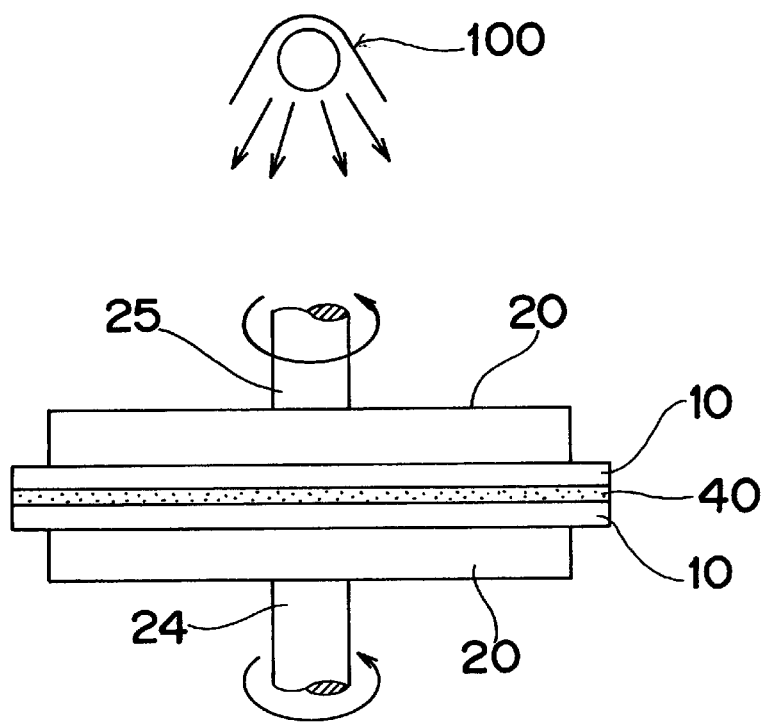
FIG. 16 is a side view showing the next process.

As shown in FIG. 16, the adhesive 40 is cured by irradiating the ultraviolet-irradiation lamp placed above. The ultraviolet irradiation may also be started at the adhesive spreading process described above. Keeping the disk single boards 10 rotating even during the ultraviolet irradiation is effective for the adhesive to be uniformly cured.

In addition, since the irradiation process is carried out with the disk single boards 10 and the adhesive 40 kept sandwiched between the upper and lower vacuum suction discs 20, the curing is effected as the disk single boards 10 and the adhesive 40 have been corrected in warp and distortion. Therefore, the planarity of the laminated disk single boards 10 can be enhanced.

(Taking-out process)

Figure 17:
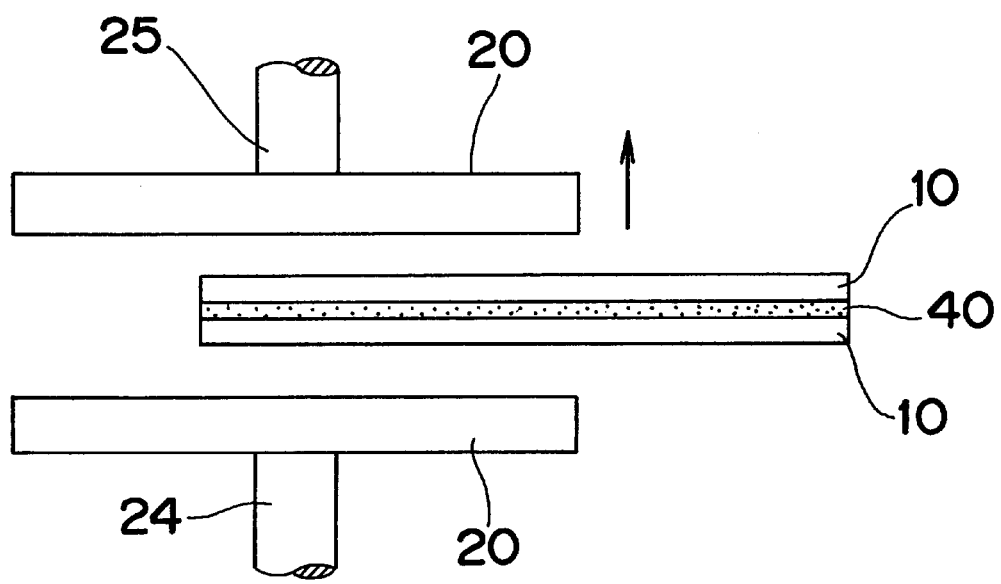
FIG. 17 is a side view showing the next process.

As shown in FIG. 17, when the adhesive 40 has been completely cured, the vacuum suction discs 20 are stopped from rotating and the upper-side vacuum suction disc 20 is moved upward, and then, the integrally joined disk single boards 10 are taken out. The laminated disk single boards 10 may also be subjected to appropriate post-processing or finishing process, depending on the purpose of use or the application.

Other Embodiments (a) In the above embodiment, the vacuum suction discs 20 are placed so that their suction surfaces 23 are opposed to each other in a substantially parallel state. However, as the disk single boards 10 may also be opposed to each other at an inclination of a relatively small angle, so the suction surfaces 23 may be placed so as to be inclined, or the shafts of the vacuum suction discs 20 may be arranged so as to be tiltable within a certain range. The inclination of the suction surfaces 23 may be adopted for both the process of placing the adhesive 40 in a loop and the process of spreading the adhesive 40 throughout.

(b) In the above embodiment, the adhesive injection nozzle 32 is inserted into the gap H by being advanced and retreated radially of the vacuum suction discs 20. However, the adhesive injection nozzle 32 may also be inserted into the gap H obliquely at an inclination with respect to the radial direction. In this case, the adhesive injection nozzle 32 is preferably so disposed that the adhesive 40 is discharged toward the rotational direction of the vacuum suction discs 20. The adhesive injection nozzle 32 may be inserted into the gap H either by being advanced and retreated linearly or by being swiveled.

(c) The discharge opening 34 of the adhesive injection nozzle 32 may be so formed that the adhesive injection nozzle 32 is cut out along a direction perpendicular to the axis as in the above embodiment, or otherwise that the adhesive injection nozzle 32 is cut out obliquely. The discharge opening 34 may be provided at a plurality of points of the adhesive injection nozzle 32. The adhesive 40 may also be discharged in directions other than the axial direction of the adhesive injection nozzle 32, depending on the configurational arrangement of the discharge openings 34.

(d) In the above embodiment, it has been arranged that the adhesive 40 is discharged into the narrow gap H between the disk single boards 10 so as to be placed in contact with the upper and lower disk single boards 10. However, it may also be arranged that, after the adhesive 40 has been applied to one disk single board 10, the other disk single board 10 is overlaid thereon, in which state the two disk single boards 10 are joined together with the adhesive 40. It is also possible that the disk single boards 10 are laminated after the adhesive 40 has been applied thereto. In these cases, since the adhesive injector 30 is not inserted into the narrow gap H, the slender adhesive injection nozzle 32 is no longer needed.

In the apparatus and method for laminating boards according to the present invention, since the boards are sucked up and held by the suction surfaces of the board holding device, by which any warp and distortion of the boards can be corrected, where the boards are joined together with adhesive as they are in the corrected state. Therefore, the adhesive layer that serves for laminating the boards becomes uniform in thickness, so that warp or distortion is unlikely to occur to the laminated boards, and that the possibility of invasion of foams is reduced. As a consequence, the lamination of boards by adhesive can be accomplished reliably and successfully, by which a laminated board excellent in quality and performance can be obtained.

In the embodiments, it is preferable that the distance (d) of the gap H between the boards 10 is $r_1 + r_2 * (0.2$ through $0.6)$ where $r_1$ is an outer diameter of the nozzle 32 and $r_2$ is an inner diameter of the nozzle 32. If the distance of the gap H is wider than the specified distance, it is difficult to apply the adhesive 40 without any foams. If the distance of the gap H is narrower than the specified distance, the adhesive injection nozzle 32 will be damaged when in contact with the disk single boards 10.

In the embodiments, it is preferable that the nozzle 32 starts to discharge the adhesive 40 at a position in a range of 30% through 70% of the radius of the board 10 from the center of the board 10. If the nozzle 32 starts the discharge of the adhesive 40 outside of the position, it is difficult to uniformly spread the adhesive 40 at the inner and outer peripheries of the boards 10.

It is preferable that the number of the rotation of the boards at the spreading process is larger than the number of the rotation of the boards at the adhesive discharge. More preferably, the former number of the rotation at the spreading process is about thirty times larger than the later number of the rotation at the adhesive discharge, so as to shake off an extra amount of the adhesive from the boards in order to spread the adhesive on the whole surfaces of the boards for shorter time of period. For example, when the number of the rotation of the boards at the spreading process is 3500 rpm and the number of the rotation of the boards at the adhesive discharge is 33 rpm. In spreading the adhesive, the number of the rotation of the boards is preferably 1000 rpm or more so as to certainly spread the adhesive on the boards.

Additionally, in the embodiments, when narrowing the gap H, the boards 10 are pressed with 5 kgm/s$^2$ so as to narrow the gap H between the boards 10 by the actuation of the up-and-down actuator 74 so that the adhesive 40 is spread throughout the gap H. At that time, there are three manners for spreading the adhesive 40. In the first manner, the boards 10 are firstly pressed with 5 kgm/s$^2$ so as to narrow the gap H between the boards 10, and thereafter the boards 10 are rotated so that the adhesive 40 is spread throughout the gap H while the boards 10 are not pressed. In the second manner, the boards 10 are firstly pressed with 5 kgm/s$^2$ so as to narrow the gap between the boards, and thereafter the boards 10 are rotated while the boards 10 are pressed so that the adhesive 40 is spread throughout the gap H. In the third manner, the boards 10 are firstly rotated so that the adhesive 40 is spread throughout the gap H, and thereafter the boards 10 are pressed by 300 gm/s² through 20 kgm/s² so as to narrow the gap H between the boards 10 while the boards 10 stop rotating. The weight for pressing the boards 10 may be changed depending on uniformity, adhesive or board thickness, adhesive viscosity etc.

Figure 18:
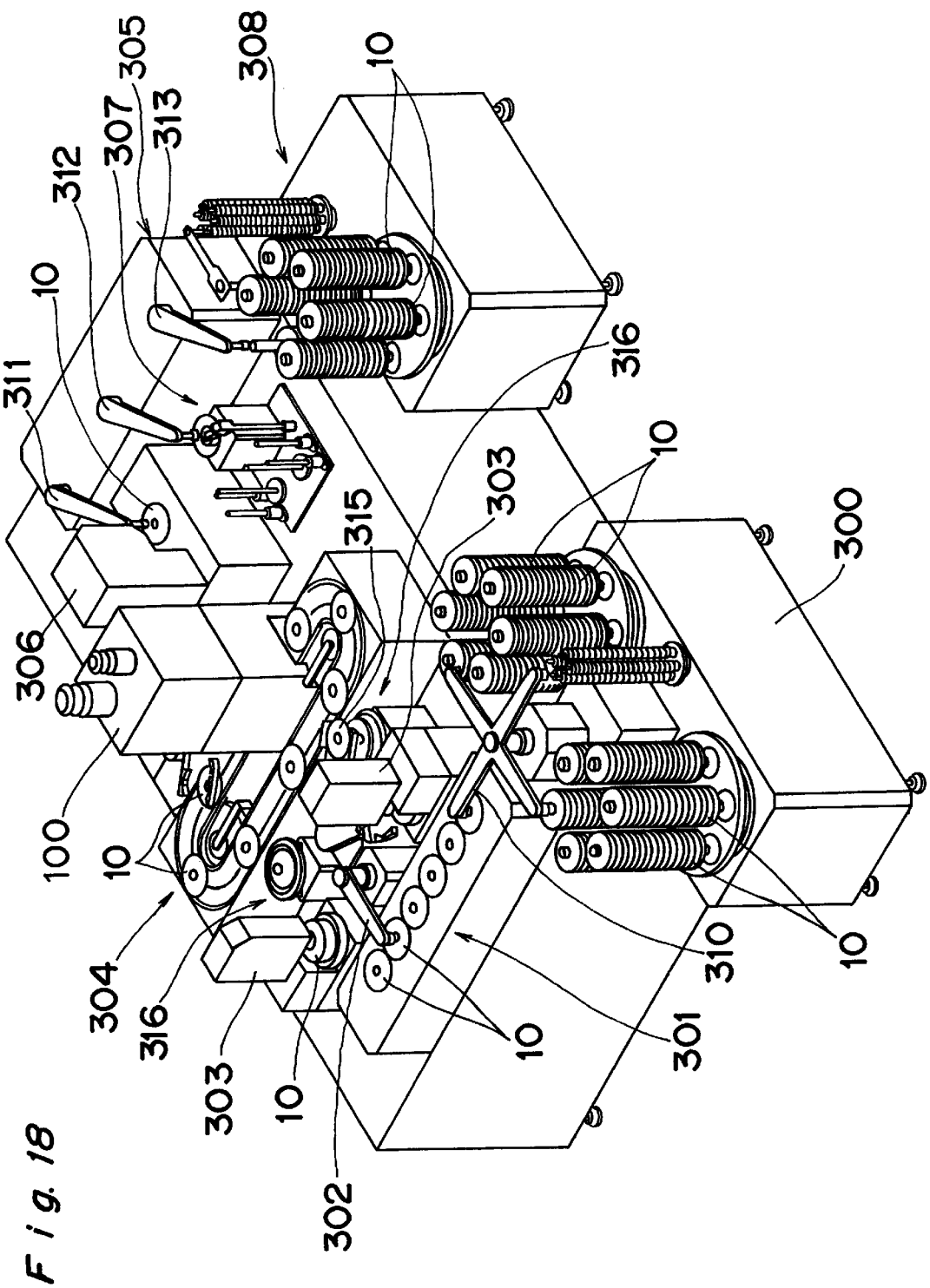
FIG. 18 a perspective view showing the whole construction of an apparatus for manufacturing DVDs including the apparatus for laminating boards.

The whole construction of an apparatus for manufacturing DVDs including the apparatus for laminating boards is shown in FIG. 18.

In FIG. 18, the manufacturing apparatus includes a supply stock device 300 for stocking boards, a disk supply unit 301, adhesive discharge units 303, a leveling units 316, a UV irradiation transfer unit 304, an ultraviolet-irradiation lamp device 100, an appearance inspecting device 306, a defective product taking-out device 307, an acceptable product transfer unit 305, and an acceptable product taking-out stock device 308.

Figure 19A:
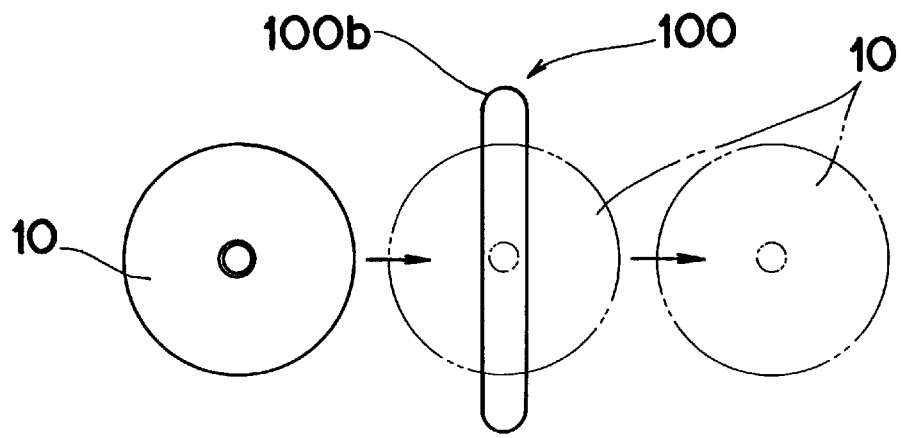
FIGS. 19A and 19B are a plan view and a side view showing a UV irradiation lamp device in the embodiments.
Figure 19B:
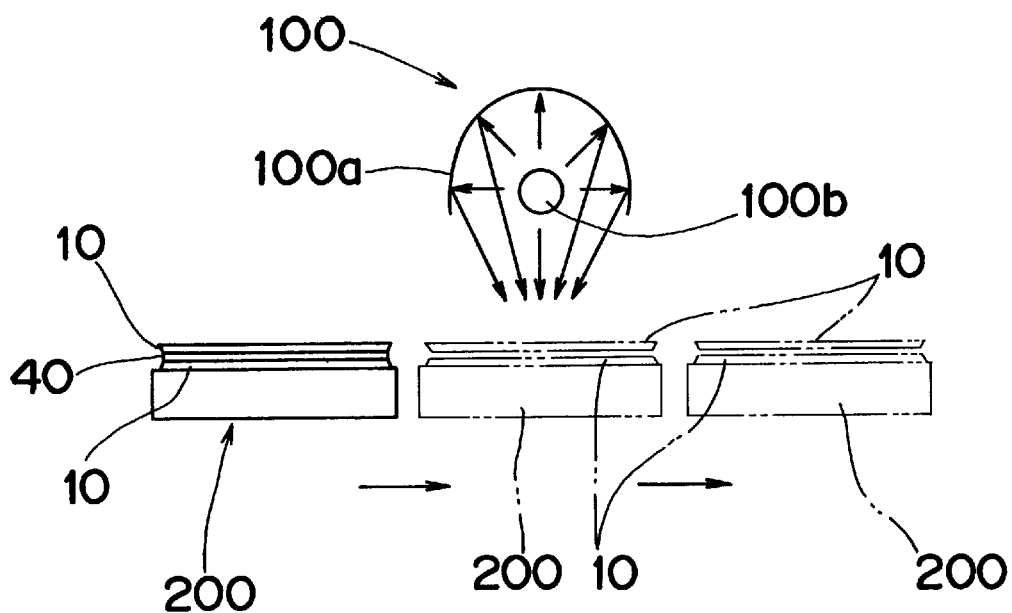

Each of four arms of a four-arm robot 310 pick up one board 10 from the supply stock device 200 to the disk supply unit 301. A supply robot handling device 302 of the disk supply unit 301 supplies the two boards 10 to one of the adhesive discharge units 303. In the adhesive discharge unit 303, as described above, the adhesive 40 is discharged into the gap H between the boards 10. In each of the leveling units 316, the adhesive 40 is spread on the whole surfaces of the boards 10 while rotating the boards 10. A taking-out robot handling device 315 takes out the boards with laminated via the adhesive 40 to the UV irradiation transfer unit 304. In the transfer unit 304, a plurality of transfer tools 200 shown in FIGS. 19A and 19B are moved in a loop and pass through the UV irradiation lamp device 100 where the adhesive 40 between the boards 10 is irradiated by the UV irradiation lamp 100b to cure it. Then, the boards 10 is transferred to the appearance inspecting device 306, so that the appearance of the boards is inspected by the appearance inspecting device 306. If the appearance inspecting device 306 decides that the boards 10 are defective, the boards 10 are transferred to the defective product taking-out device 307 to take out the defective boards 10. When the appearance inspecting device 306 decides that the boards 10 are acceptable as a DVD, the boards 10 are transferred to the acceptable product taking-out stock device 308 via three arms 311, 312, and 313 of the acceptable product transfer unit 305.

When the adhesive 40 is an ultraviolet-curing adhesive, as shown in FIGS. 19A and 19B, the boards 10 are linearly transferred by the transfer tool 200 so that the adhesive 40 between the boards 10 is cured by the ultraviolet-irradiation lamp device 100 after the gap H is narrowed. In the figures, reference numeral 100a denotes a UV reflector for reflecting the UV light to the adhesive side, and 100b denotes the ultraviolet-irradiation lamp. In this case, instead of moving the boards 10, the ultraviolet-irradiation lamp device 100 may move linearly on the boards 10.

(SEVENTH EMBODIMENT)

FIG. 20 shows a mechanism for driving, by one motor 153, the up-and-down movement of the vacuum suction disc 20; and the advancing and retreating movement of the adhesive injector 30, the adhesive discharge mechanism including the piston 36, the motor 50, the support member 52, the screw gear 54, and the fixed rack 56.

In FIG. 20, the motor 153 rotates a cam 154 on which first and second cam followers 152b and 155a are followed. The first cam follower 152b is rotatably arranged at one end of a first lever 152 pivotable around a fulcrum 152c. The other end 152a of the first lever 152 is connected to one end 150b of a third lever 150 via a connecting member 151. The third lever 150 can pivot around a fulcrum 150c. The other end 150a of the second lever 150 is movably fitted into an engaging recess 25a of the shaft 25. Thus, when the cam 154 is rotated, the first cam follower 152b moves to pivot the first lever 152. When the first lever pivots, the third lever 150 also pivots around its fulcrum 150c to move the upper vacuum suction disc 20 upward or downward.

On the other hand, the second cam follower 155a is rotatably arranged at one end of a second lever 155 pivotable around a fulcrum 155c. The other end 155b of the second lever 155 is connected to an engaging recess 156a of a driving member 156. The other end of the driving member 156 is connected to a holder 800 including the adhesive injector 30, the adhesive discharge mechanism including the piston 36, the motor 50, the support member 52, the screw gear 54, and the fixed rack 56. The holder 800 is linearly guided with slide guides 157 on a base 158. Thus, when the cam 154 is rotated, the second cam follower 155a moves to pivot the second lever 155 around its fulcrum 155c to linearly move the holder 800 into the boards 10 with the driving member 156 and the guides 157.

The up-and-down movement of the vacuum suction disc 20, the advancing and retreating movement of the adhesive injector 30, the discharge of the nozzle 32, the rotation of the vacuum suction discs 20 can be synchronized with each other under control of a controller 900 connected to the motors 50, 60, 153 in order to perform the various kinds of operations described in the specification and claims, if necessary.

The entire disclosure of Japanese Patent Applications No. 8-73536 filed on Mar. 28, 1996 and No. 8-89243 filed on Apr. 11, 1996, including specifications, claims, drawings, and summaries are incorporated herein by reference in their entireties.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of laminating boards by a medium of adhesive, said method comprising:

placing a first board and a second board face to face such that a narrow gap is defined between opposing faces of the first and second boards;

inserting an adhesive injection nozzle into the gap;

discharging adhesive from the adhesive injection nozzle into the gap so that the discharged adhesive makes contact with the opposing faces of the first and second boards while a distance between the boards is $r_1+r_2$* (0.2 through 0.6) where $r_1$ is an outer diameter of the adhesive injection nozzle and $r_2$ is an inner diameter of the nozzle;

rotating the boards about a center of rotation as the adhesive is discharged so that the adhesive is placed in the gap, wherein the adhesive discharge nozzle starts to discharge the adhesive at a position in a range of 30% to 70% of a radius of the board from a center of the board such that the adhesive is placed in a loop having a start point and an end point that is shifted in a radial direction of the boards with respect the start point;

retracting the nozzle from the gap; and narrowing the gap between the first and second boards so that the placed adhesive is spread throughout the gap.

2. A method of laminating boards as claimed in claim 1, wherein the adhesive is discharged from the injection nozzle in a direction that is oblique with respect to a radial direction of the first and second boards.

3. A method of laminating boards as claimed in claim 1, wherein the rotation of the first and second boards and discharge of the adhesive are mechanically synchronized.

4. A method of laminating boards as claimed in claim 1, further comprising pressing the first and second boards so as to narrow the gap, wherein the boards are rotated after the boards have been pressed to spread adhesive throughout the gap.

5. A method of laminating boards as claimed in claim 1, wherein during narrowing of the gap, the boards are rotated so that adhesive is spread throughout the gap, and then the rotation of the boards is stopped, and then the boards are pressed together to narrow the gap.

6. A method of laminating boards as claimed in claim 1, further comprising pressing the first and second boards so as to narrow the gap, wherein the boards are rotated while the boards are being pressed so as to spread adhesive throughout the gap.

7. A method of laminating boards as claimed in claim 6, wherein the adhesive is an ultraviolet curing adhesive, and the method further comprises curing the adhesive with an ultraviolet-irradiation lamp after the gap has been narrowed.

8. A method of laminating boards as claimed in claim 7, wherein the ultraviolet-irradiation lamp is elongated.

9. A method of laminating boards as claimed in claim 1, wherein while the adhesive in placed in the gap, the first and second boards are held in a substantially parallel relationship during rotation thereof.

10. A method of laminating boards as claimed in claim 1, wherein the adhesive injection nozzle is inserted into the gap in a direction that is oblique with respect to a radial direction of the first and second boards.

11. A method of laminating boards by a medium of adhesive, said method comprising:

placing a first board and a second board face to face such that a narrow gap is defined between opposing faces of the first and second boards;

inserting an adhesive injection nozzle into the gap, wherein a portion of the adhesive injection nozzle that is inserted into the gap has an elongated oval shaped cross section;

discharging adhesive from the adhesive injection nozzle into the gap so that the discharged adhesive makes contact with the opposing faces of the first and second boards;

rotating the boards about a center of rotation, as the adhesive is discharged, so that the adhesive is placed in the gap, wherein the adhesive discharge nozzle starts to discharge the adhesive at a start point and terminates discharge of the adhesive at an end point so as to define a loop of discharged adhesive, wherein the end point is shifted outward in a radial direction of the boards with respect the start point;

retracting the nozzle from the gap; and narrowing the gap between the first and second boards so that the placed adhesive is spread throughout the gap.

12. A method of laminating boards, the method comprising:

holding first and second boards in a parallel relationship on suction surfaces of a pair of board holding devices, respectively, wherein the suction surfaces are formed of a rigid material so that a surface of each board is held in contact with one of the suction surfaces, and a gap is defined between opposing surfaces of the first and second boards;

feeding adhesive onto opposing surfaces of the first and second boards;

rotating the boards about a center of rotation as the adhesive is fed so that the adhesive is placed in the gap, wherein the adhesive discharge nozzle discharges the adhesive so that the adhesive is placed in the form of a loop having a start point and an end point that is shifted in an outward radial direction of the boards with respect the start point;

moving the board holding devices relative to each other in order to narrow the gap between the opposing surfaces of the first and second boards; and synchronously rotating the first and second boards by operation of the board holding devices, wherein the first and second boards are held in parallel relationship during rotation of the first and second boards.

* * * * *